United States Patent
Julian et al.

(10) Patent No.: US 9,565,651 B2
(45) Date of Patent: Feb. 7, 2017

(54) SYSTEM AND METHOD FOR CONTROLLING PAGING DELAY WITH TIMING ARRANGEMENTS AND DUAL PAGE SCANS

(71) Applicants: David Jonathan Julian, San Diego, CA (US); Zhanfeng Jia, Belmont, CA (US); Qingjiang Tian, San Diego, CA (US); Edward Harrison Teague, San Diego, CA (US)

(72) Inventors: David Jonathan Julian, San Diego, CA (US); Zhanfeng Jia, Belmont, CA (US); Qingjiang Tian, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 13/622,300

(22) Filed: Sep. 18, 2012

(65) Prior Publication Data

US 2014/0018068 A1    Jan. 16, 2014

Related U.S. Application Data

(60) Provisional application No. 61/670,547, filed on Jul. 11, 2012.

(51) Int. Cl.
*H04W 68/00*    (2009.01)
*H04W 68/02*    (2009.01)
(Continued)

(52) U.S. Cl.
CPC .......... *H04W 68/02* (2013.01); *H04W 76/048* (2013.01); *H04W 84/18* (2013.01)

(58) Field of Classification Search
CPC .............................. H04W 48/16; H04W 48/18
(Continued)

(56) References Cited

U.S. PATENT DOCUMENTS 7,200,412 B2    4/2007    Kim
8,009,691 B2    8/2011    Liu
(Continued)

OTHER PUBLICATIONS

International Search Report and Written Opinion—PCT/US2013/049959—ISA/EPO—Mar. 27, 2014.
(Continued)

*Primary Examiner* — Chuck Huynh
(74) *Attorney, Agent, or Firm* — Kevin T. Cheatham

(57) ABSTRACT

Systems and methods for controlling a delay associated with paging a remote device. In one implementation, a paging device arranges page operations such that if one of two consecutive page scans performed by a remote device occurs during a response scan, the other page scan occurs during the transmission of a page. In another implementation, a device scanning for a page arranges page scans such that if one of two consecutive page scans occurs during a page response scan, the other page scan occurs during the transmission of a page. In another implementation, a device scanning for a page performs a series of sets of separate page scans, wherein the time interval between two of separate scans in a set is less than the time interval between adjacent sets. The page scans in a set are configured to ensure that one of them occurs during the transmission of a page.

18 Claims, 10 Drawing Sheets

(51) Int. Cl.
*H04W 76/04* (2009.01)
*H04W 84/18* (2009.01)

(58) Field of Classification Search
USPC .............................. 455/434, 458, 515, 426.1
See application file for complete search history.

(56) References Cited

U.S. PATENT DOCUMENTS

| | | | |
|---|---|---|---|
| 8,391,897 | B1 * | 3/2013 | Oroskar et al. ............... 455/458 |
| 2003/0012173 | A1 | 1/2003 | Rune |
| 2006/0013160 | A1 | 1/2006 | Haartsen |
| 2008/0019287 | A1 | 1/2008 | Hong |
| 2010/0323610 | A1 | 12/2010 | Li et al. |
| 2011/0045771 | A1 | 2/2011 | Sen et al. |

OTHER PUBLICATIONS

Jiang et al. "Analysis of Bluetooth device discovery and some speedup mechanisms," Journal of the Institute of Electrical Engineering [Online] 2004, 11(4), pp. 1-13.

* cited by examiner

SYSTEM AND METHOD FOR CONTROLLING PAGING DELAY WITH TIMING ARRANGEMENTS AND DUAL PAGE SCANS

CROSS REFERENCE TO A RELATED APPLICATION

This application claims the benefit of the filing date of Provisional Application, Ser. No. 61/670,547, filed on Jul. 11, 2012, and entitled, "System and Method for Controlling Paging Delay with Timing Arrangements and Dual Page Scans," which is incorporated herein by reference.

FIELD

The present disclosure relates generally to communication systems, and more specifically, to a system and method for controlling a delay associated with successfully paging a remote wireless communication device through the use of timing arrangements of page operations and page scans, and implementing sets of multiple (e.g., dual) page scans.

BACKGROUND

In many communication systems, two or more wireless devices may communicate data between each other by way of a dedicated communication channel. Typically, prior to the establishment of the dedicated channel, the wireless devices undergo a channel setup procedure which involves communicating one or more channel parameters between each other. Once the channel parameters are set, the wireless devices may communicate with each other by way of the dedicated channel.

Often, a common or a priori communication channel exists between the wireless devices. The common communication channel may be used by wireless devices to set up dedicated wireless channels. More specifically, the wireless devices communicate the one or more channel parameters associated with establishing the dedicated channel using the common communication channel. In order to initiate the setup of the dedicated channel, an initiating device may perform a paging procedure to page a responding device.

In some systems, the initiating device may perform the paging procedure before discovering the responding device. In this regard, the initiating device may perform a paging procedure to learn the identity and/or other information about the responding device. In the same or other systems, the initiating device may perform the paging procedure after the responding device has been discovered. In this regards, the initiating device may perform a paging procedure to establish a dedicated channel with the responding device. This may involve exchanging authentication and/or other information to determine whether the dedicated channel is authorized.

In some systems, the initiating device performs a paging procedure by periodically performing paging operations, wherein each operation comprises a transmission of a page followed by scan for a response to the page. In some systems, the responding device may also periodically scan for the page, and when the responding device successfully receives a page from the initiating device, the responding device transmits a page response to the initiating device. Although, in this example, the initiating device performs the paging operations and the responding device performs the page scans, generally both devices perform their own paging operations and page scans.

Often, in some systems, the paging operations performed by the initiating device are asynchronous with the page scans performed by the responding device. In such systems, the responding device may fail to receive the page during one or more page scans. This may be the case when a page scan performed by the responding device occurs at the same time as a response scan performed by the initiating device. In other words, both devices are listening, and, consequently, the responding device fails to receive a page from the initiating device. The asynchronous timing between the paging operations and the page scans may be such that multiple page scan cycles fail before eventually one succeeds. This may result in an undesirable delay in successfully paging the responding device.

SUMMARY

An aspect of the disclosure relates to a method of scanning for a page from at least one remote device, wherein the at least one remote device is configured to periodically perform page operations, and wherein each page operation comprises a transmission of a page and a scan for a page response. The method comprises performing a series of page scans including arranging the series of page scans in time so that if one of two consecutive page scans occurs during one of the page response scans, the other of the two consecutive page scans occurs during the transmission of one of the pages.

In another aspect of the disclosure, the arranging of the series of page scans in time is based on a duration of the transmission of the page. In another aspect, the arranging of the series of page scans in time is based on a duration of the response scan. In yet another aspect, the series of page scans are periodic, and the arranging of the series of page scans in time comprises setting a period of the periodic page scans. In still another aspect, the setting of the period of the periodic page scans is based on a following relationship:

$$T = \left(n + \frac{1}{2}\right)(X + Y)$$

wherein T is the period of the periodic page scans, X is a duration of the transmission of the page, Y is a duration of the response scan, and n is an integer.

In another aspect of the disclosure, the method comprises determining a duration of the transmission of the page, and adjusting a timing of performing the page scans based on the duration. In another aspect, the method comprises determining a duration of the response scan, and adjusting a timing of performing the page scans based on the duration. In still another aspect, the method comprises determining a rate difference between a rate at which the page operations are performed and a rate at which the page scans are performed, and adjusting a timing of performing the page scans based on the rate difference. In yet another aspect, the method comprises determining a rate difference between a rate at which the page operations are performed and a rate at which the page scans are performed, and determining whether to adjust the timing of performing the page scans based on the rate difference. In an additional aspect, the timing of the page operations is independent of the timing of the page scans.

In another aspect of the disclosure, the method comprises performing another timing arrangement for the series of page scans for a second remote device based on a duration of the transmission of the pages of the second remote device that differs from a duration of the transmission of the pages of the at least one remote device. In yet another aspect, the method comprises performing another timing arrangement for the series of page scans for a second remote device based on a duration of the response scans of the second remote device that differs from a duration of the response scans of the at least one remote device. In still another aspect, the performing of each page scan comprises configuring a receiver for detecting the page for a defined interval, and configuring the receiver for not detecting the page before and after the defined interval.

Another aspect of the disclosure relates to a method of paging at least one remote device. The method comprises performing a series of page operations, wherein each page operation comprises transmitting a page and scanning for a page response. The method further comprises arranging a timing of the page operations so that if one of two consecutive periodic page scans performed by the at least one remote device occurs during one of the page response scans, the other of the two consecutive periodic page scans occurs during the transmission of one of the pages.

In another aspect of the disclosure, the arranging of the timing of the page operations is based on a period of the periodic page scans performed by the at least one remote device. In another aspect, the arranging of the timing of the page operations comprises setting a duration of the transmission of the page. In yet another aspect, the arranging of the timing of the page operations comprises setting a duration of the response scan. In still another aspect, the setting of the duration of the transmission of the page and/or the duration of the response scan may be based on the following relationship:

$$T = \left(n + \frac{1}{2}\right)(X + Y)$$

wherein T is a period of the periodic page scans performed by the at least one remote device, X is the duration of the transmission of the page, Y is a duration of the response scan, and n is an integer.

In another aspect of the disclosure, the method further comprises determining a period of the periodic page scans performed by the at least one remote device, and adjusting a duration of the transmission of the page based on the period. In yet another aspect, the method further comprises determining a period of the periodic page scans performed by the at least one remote device, and adjusting a duration of the page response scan based on the period. In still another aspect, the method further comprises determining a period of periodic page scans performed by the at least one remote device, and adding one or more blank intervals to the page operations, wherein the one or more blank intervals are based on the period.

In another aspect of the disclosure, the method further comprises determining a rate difference between a rate at which the page operations are performed and a rate at which the page scans are performed, wherein the arranging of the timing of the page operations is based on the rate difference. In yet another aspect, the method further comprises determining a rate difference between a rate at which the page operations are performed and a rate at which the page scans are performed, and adjusting a duration of the transmission of the page based on the rate difference. In still another aspect, the method further comprises determining a rate difference between a rate at which the page operations are performed and a rate at which the page scans are performed, and adjusting a duration of the response scan based on the rate difference. In an additional aspect, the method comprises determining a rate difference between a rate at which the page operations are performed and a rate at which the page scans are performed; and determining whether to adjust the timing of performing the page scans based on the rate difference.

In another aspect, the method further comprises adjusting a duration of the response scans on a per cycle basis. In yet another aspect, the timing of the page operations is independent of the timing of the page scans. In still another aspect, the method further comprises performing another timing arrangement for the page operations for a second remote device based on a period of periodic page scans performed by the second remote device that differs from a period of the periodic page scans performed by the at least one remote device.

Another aspect of the disclosure relates to a method of scanning for a page transmitted by at least one remote device. The method comprises performing a series of sets of separate scans for the page, wherein a first time interval between two of the separate scans in the each is less than a second time interval between the sets of separate scans.

In another aspect of the disclosure, the method comprises responsive to receiving the page during one of the scans, canceling one or more subsequent scans. In another aspect, the method comprises responsive to receiving the page, transmitting a page response to the at least one remote device. In yet another aspect, the page is received by way of a wireless communication channel, and the response is transmitted via the wireless communication channel. In still another aspect, the timing of the transmission of the page response is based on the page.

In another aspect of the disclosure, the at least one remote device is configured to perform a series of page operations, wherein each page operation comprises a transmission of the page and a scan for a page response. In another aspect, the at least one remote device is configured to cease transmitting the page while performing the scan for the page response. In yet another aspect, the at least one remote device is configured to cease scanning for the page response while transmitting the page.

In another aspect of the disclosure, the first time interval between the two scans in each set is based on a duration of at least one of the page response scans. In another aspect, the first time interval between the two scans in each set is substantially equal to or greater than a duration of at least one of the page response scans. In yet another aspect, the first time interval between the two scans in each set is based on a duration of at least one of the page transmission. In another aspect, the first time interval between the two scans in the each is substantially equal to or less than a duration of at least one of the page transmissions.

In another aspect of the disclosure, the first time interval ensures that at least one of the scans in at least one of the sets occurs during the transmission of one of the pages by the at least one remote device. In another aspect, the method comprises transmitting the page response during one of the page response scans performed by the at least one remote device. In yet another aspect, the method comprises determining information related to the page operations performed by the at least one remote device. In still another aspect, the information is determined as a result of a discovery procedure performed by the at least one remote device. In an additional aspect, the performing of the series of sets of separate scans is based on the information.

In another aspect of the disclosure, the timing of performing the series of sets of separate scans is independent of a timing of page operations performed by the at least one remote device. In yet another aspect, performing each of the page scans comprises configuring a receiver for detecting the page for a defined interval, and configuring the receiver for not detecting the page before and after the defined interval.

Other aspect of the disclosure relates to apparatus, components, modules, devices, encoded computer-readable storage mediums, and other elements configured to achieve the operations in accordance with the aforementioned method. In general, other aspects, advantages and novel features of the present disclosure will become apparent from the following detailed description of the disclosure when considered in conjunction with the accompanying drawings.

The word "exemplary" is used herein to mean "serving as an example, instance, or illustration." Any aspect described herein as "exemplary" is not necessarily to be construed as preferred or advantageous over other aspects."

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
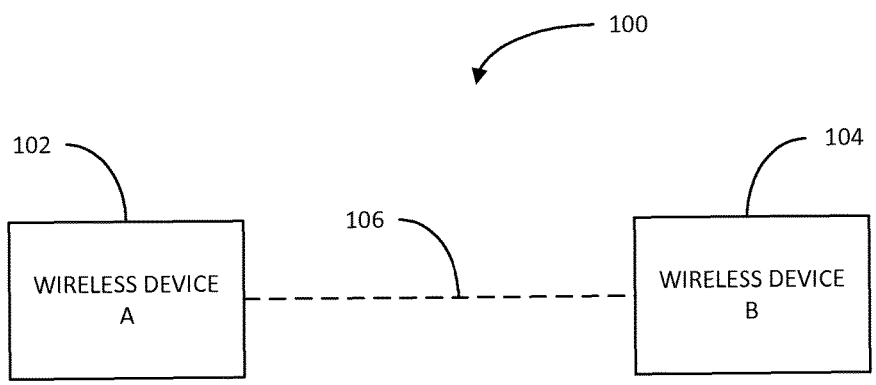
FIG. 1 illustrates a block diagram of an exemplary communication system in accordance with an aspect of the disclosure.

FIG. 1 illustrates a block diagram of an exemplary communication system 100 in accordance with an aspect of the disclosure. The communication system 100 comprises a wireless device "A" 102 and a wireless device "B" 104. The wireless devices 102 and 104 may communicate with each other by way of a wireless communication channel 106. The wireless communication channel 106 may be a common channel shared by devices 102 and 104, as well as other devices, and a priori known to the devices. Alternatively, the wireless communication channel 106 may be a dedicated communication link between the devices 102 and 104, as well as other devices.

In the examples provided herein, wireless device A 102 serves as an example of a device attempting to page wireless device B 104 in order to establish a communication channel with wireless device B 104. In some situations, wireless device A 102 may not be aware of the presence of wireless device B 104, and the paging performed may be pursuant to a discovery procedure in order to attempt to learn of the identities of nearby devices, such as wireless device B 104. In such situations, the communication channel that may be established after a successful paging operation may be a common or a dedicated communication channel. In other situations, wireless device A 102 may already be aware of the presence of wireless device B 104, and the paging performed may be for the purpose of establishing a dedicated communication channel between the devices in order to communicate traffic data and/or other types of data.

In this example, wireless device A 102 may attempt to page wireless device B 104 by performing a series of paging operations. Each paging operation may comprise an interval where wireless device A 102 transmits the page, and another interval where wireless device A 102 scans for a response from wireless device B 104 (or another device). The wireless device A 102 may perform the paging operations in a periodic and consecutive manner, or in other manners. Wireless device A 102 may transmit the page by way of a wireless communication channel, and scan for a response from wireless device B 104 by way of the same wireless communication channel or a different channel. Wireless device A 102 may perform each paging operation by transmitting the page while not scanning for the page response, and then perform the scanning for the page response while not transmitting the page.

In this example, the wireless device B 104 may also perform a series of scans for the page transmitted by wireless device A 102. The wireless device B 104 may perform the series of scans in a periodic manner, or in other manners. In between scans, the wireless device B 104 may configure its receiver in a mode that it is not capable of receiving a page from wireless device A 102 in order to conserve power. In this regard, for example, wireless device B 104 may disable one or more components of its receiver, or configure its receiver in a lower power consumption mode. Additionally, in order to conserve power, wireless device B 104 may perform the page scans in a relatively infrequent manner as compared to the frequency in which the paging operations are performed by wireless device A 102. In other words, many repetitions of the page operations may occur for every page scan performed by wireless device B 104.

In some situations, wireless device A 102 may perform the series of page operations independent of the series of page scans performed by wireless device B 104. In other words, the page operations and page scans are asynchronous. In such asynchronous operations, there may be a substantial delay associated with wireless device A 102 receiving a page response from wireless device B 104. The delay may be associated with multiple occurrences of wireless device B 104 performing a page scan at the same time as wireless device A 102 performs a response scan. In other words, both devices are scanning or listening at the same time. Or, said differently, wireless device B 104 misses receiving the page because it scans or wakes up when wireless device A 102 is not transmitting the page. This is explained further with reference to the following example.

Figure 2:
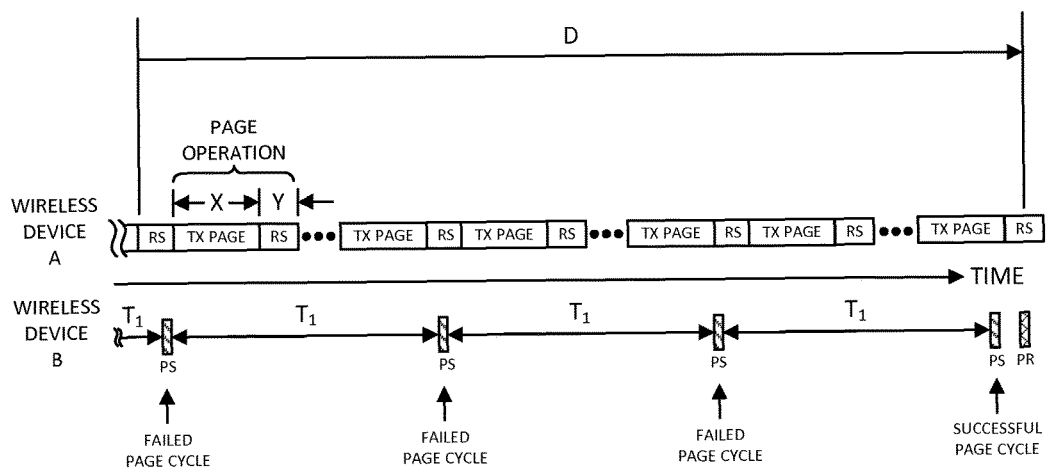
FIG. 2 illustrates a timing diagram of exemplary page operations and page scans implemented by respective devices of an exemplary communication system in accordance with another aspect of the disclosure.

FIG. 2 illustrates a timing diagram of exemplary page operations and page scans implemented respectively by wireless devices 102 and 104 of the exemplary communication system 100 in accordance with another aspect of the disclosure. The horizontal axis, as indicated by the arrowed line labeled "TIME", represents time. Examples of the series of page operations performed by wireless device A 102 are illustrated above the horizontal time axis. Examples of the series of page scans performed by wireless device B 104 are illustrated below the horizontal time axis.

More specifically, as exemplified, wireless device A 102 may perform the series of page operations in a repetitive and consecutive manner. Each page operation comprises an interval in which the page is transmitted, and a following interval in which a scan for a page response (RS) is performed. In this example, the page transmission interval has a duration of X, and the response scan interval has a duration of Y. Wireless device B 104 may perform scans for the page (PS) in a repetitive manner, for example, with a period of $T_1$. As previously mentioned, for power conservation purposes, the period $T_1$ associated with the page scans performed by wireless device B 104 may be relatively large as compared to the period associated with the page operations performed by wireless device A 102.

Since, as previously discussed, the page operations performed by wireless device A 102 may be independent of the page scans (PS) performed by wireless device B 104, there may be multiple occurrences where the page scan (PS) performed by wireless device B 104 occurs at the same time as the response scan (RS) performed by wireless device A 102. For instance, in the example of FIG. 2, the first indicated page scan (PS) performed by wireless device B 104 occurs at the same time as a response scan (RS) is performed by wireless device A 102. As a result, wireless device B 104 fails to receive the page from wireless device A 102 during this page scan cycle. Similarly, the following indicated page scan (PS) performed by wireless device B 104 also occurs at the same time as a response scan (RS) is performed by wireless device A 102, resulting in another failed page scan cycle. Likewise, the third indicated page scan (PS) performed by wireless device B 104 also occurs at the same time as a response scan (RS) is performed by wireless device A 102, resulting in yet another failed page scan cycle.

In this example, the fourth indicated page scan (PS) performed by wireless device B 104 occurs at the same time as the transmission of the page by wireless device A 102. Accordingly, wireless device B 104 receives the page from wireless device A 102. In response to receiving the page, wireless device B 104 transmits a page response (PR) during the time interval (RS) that wireless device A 102 is scanning for the response. Thus, wireless device A 102 receives the page response (PR) from wireless device B 104, resulting in a successful page cycle, as indicated. Based on a priori knowledge of the page operations of wireless device A 102, wireless device B 104 may be able to transmit the page response (PR) during the response scan (RS) performed by wireless device A 102. For example, wireless device B 104 may be configured to transmit the page response within a predetermined time period after receiving the page.

As this example illustrates, because of the asynchronous relationship between the page operations performed by wireless device A 102 and the page scans performed by wireless device B 104, there may be a substantial delay associated with wireless device A 102 successfully receiving a page response from wireless device B 104. In the case where the devices 102 and 104 have not discovered each other and are performing discovery paging operations, the delay D may be measured from the time both devices 102 and 104 are proximate enough to each other to be able to receive the page response and page, respectively, to the time wireless device A 102 successfully receives a page response from wireless device B 104. In the case where the devices 102 and 104 have already discovered each other and device 102 wishes to page device 104, the delay D may be measured from the time wireless device A 102 begins paging wireless device B 104 to the time wireless device A 102 successfully receives a page response from wireless device B 104. The following describes techniques for controlling or reducing the delay D associated with wireless device A 102 successfully receiving a page response from wireless device B 104.

Figure 3:
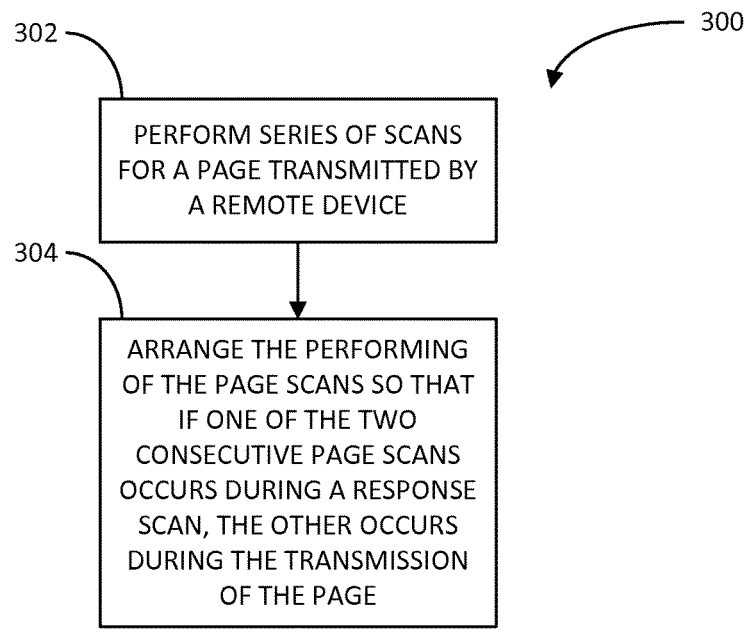
FIG. 3 illustrates a flow diagram of an exemplary method of scanning for a page from a remote device in accordance with another aspect of the disclosure.

FIG. 3 illustrates a flow diagram of an exemplary method 300 of scanning for a page from a remote device in accordance with another aspect of the disclosure. The operations of the method 300 may be implemented by wireless device B 104 in attempting to receive a page from wireless device A 102. According to the method 300, wireless device B 104 performs a series of scans for a page transmitted by wireless device A 102 (block 302). Further, in accordance with the method 300, wireless device B 104 arranges the performing of the page scans such that if one of two consecutive page scans occurs during a response scan performed by wireless device A 102, the other of the two consecutive page scans occurs during the transmission of a page by wireless device A 102 (block 304).

As discussed in more detail herein, based on knowledge of the page operations performed by wireless device A 102, wireless device B 104 may be able to adjust the time interval between consecutive page scans or the period associated with periodic page scans to ensure that one of two consecutive page scans occurs during the transmission of a page by wireless device A 102. If wireless device B 104 is able to receive a page from wireless device A 102 no later than the second page scan of two consecutive page scans, and wireless device B 104 is able to transmit a page response to wireless device A 102 within a predetermined time interval after receiving the page, the maximum delay associated with performing a successful operation may be configured to be relatively short.

As an example, wireless device A 102 performs periodic page operations, wherein each page operation includes a transmission of a page and a scan for a page response from wireless device B 104. The duration of the transmission of the page may be represented as X, and the duration of the scan for the page response may be represented as Y. According to this example, the duration X is greater than the duration Y. Additionally, in accordance with this example, wireless device B 104 performs periodic scans for the page. Based on these exemplary conditions, wireless device B 104 can ensure that one of two consecutive page scans occurs during the transmission of a page by wireless device A 102 if wireless device B 104 arranges the period T of the periodic page scans in accordance with the following relationship:

$$T = \left(n + \frac{1}{2}\right)(X + Y) \qquad \text{Eq. 1}$$

where n is an integer, and as previously discussed, X is the duration of the transmission of a page, and Y is the duration of the scan for the page response.

An objective of configuring the period T in accordance with Eq. 1 is to cause the second consecutive page scan to occur in the middle of a page transmission interval X if the first consecutive page scan occurs in the middle of a response scan interval Y. If, as discussed above, the duration X is greater than the duration Y, then the second consecutive page scan performed in accordance with Eq. 1 will occur during the page transmission interval X regardless of where the first consecutive page scan occurs within the response scan interval Y.

The period T of the page scans in accordance with Eq. 1 may be broken down into two components: the first component n(X+Y) and the second component ½(X+Y). The first component n(X+Y) indicates the number of page operations between consecutive page scans. If the period T were configured to only include the first component n(X+Y), the first and second consecutive page scans would occur at the same interval of a page operation (e.g., within the response scan interval Y), which is not desirable to ensure that one of two consecutive page scans occurs during the page transmission interval X. The second component ½(X+Y) shifts occurrence of the second consecutive page scan half the duration of a page operation. Thus, by doing this, if the first consecutive page scan occurs during the response scan interval Y, the second consecutive page scan occurs during the page transmission interval X.

In some situations, there may exist a rate difference C between the rate at which the page operations are performed by wireless device A 102 and the rate at which the page scans are performed by wireless device B 104. If the rate difference C is sufficiently large, wireless device B 104 configuring the period T of the periodic page scans in accordance with Eq. 1 might not ensure that one of two consecutive page scans occurs during the page transmission interval X. On the other hand, if the rate difference C is sufficiently small, wireless device B 104 configuring the period T of the periodic page scans in accordance with Eq. 1 may still ensure that one of two consecutive page scans occurs during the page transmission interval X. For instance, wireless device B 104 may still ensure that one of two consecutive page scans occurs during the page transmission interval X if the following relationship holds:

$$|T \cdot C| < \frac{X - Y}{2} \qquad \text{Eq. 2}$$

The term |T·C| in Eq. 2 represents the time shift in the occurrence of a page scan accrued over one period T of the periodic page scans due to the rate difference C. The other term x−y/2 in n Eq. 2 represents the maximum time shift which, if exceeded, would not ensure that one of two consecutive page scans occurs during the page transmission interval X. Thus, if the rate difference C may be constrained by specification or by a synchronization procedure performed by the two devices 102 and 104, then wireless device B 104 may ensure that one of two consecutive page scans occurs during the page transmission interval X by configuring the period T of the periodic page scans in accordance with Eq. 1.

In another scenario where, for example, the rate difference C is not able to be constrained in accordance with Eq. 2, wireless device B 104 may be able to determine the rate difference C through a procedure conducted with wireless device A 102, and then adjust the time T given by Eq. 1 based on the determined rate difference C. For instance, wireless device B 104 may ensure that one of two consecutive page scans occurs during the page transmission interval X by setting the adjusted new period $T_{adj}$ of the periodic page scans in accordance with the following relationship:

$$T_{adj} = T + T \cdot C \qquad \text{Eq. 3}$$

where T is the period of the period page scans in accordance with Eq. 1, and C is the measured or determined rate difference between the rate at which the page operations are performed by wireless device A 102 and the rate at which the page scans are performed by wireless device B 104.

Thus, if wireless device B 104 determines that the rate difference C satisfies Eq. 2, wireless device B 104 may configure the period T of the page scans in accordance with Eq. 1. If, on the other hand, wireless device B 104 determines that the rate difference C does not satisfy Eq. 2, wireless device B 104 may configure the period of the page scans in accordance with Eq. 3. Based on the aforementioned concepts, the following provides an example of a more detailed method of scanning for a page from a remote device.

Figure 4:
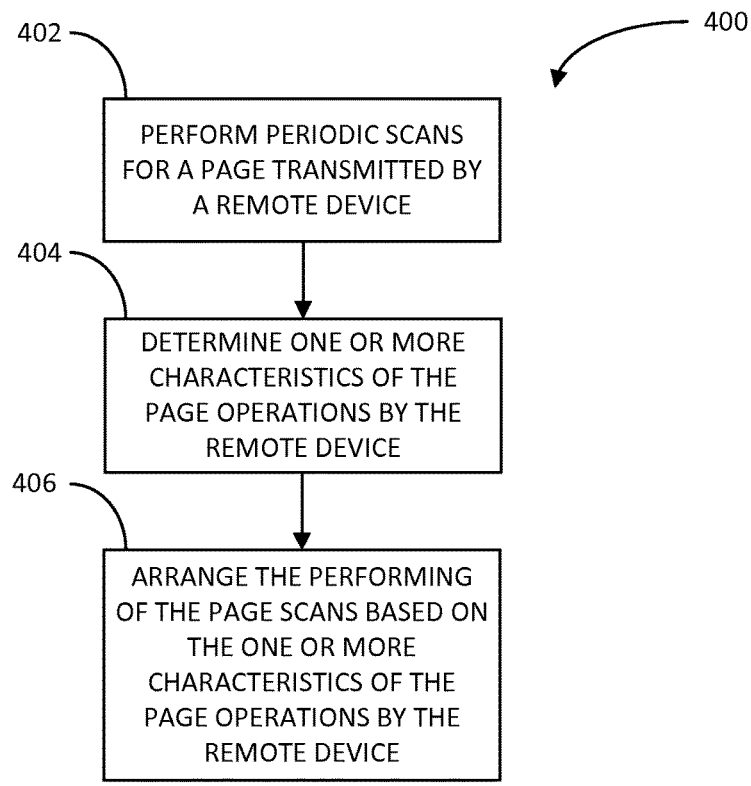
FIG. 4 illustrates a flow diagram of another exemplary method of scanning for a page from a remote device in accordance with another aspect of the disclosure.

FIG. 4 illustrates a flow diagram of an exemplary method 400 of scanning for a page transmitted by a remote device in accordance with another aspect of the disclosure. The operations of the method 400 may be implemented by wireless device B 104 in attempting to receive a page from wireless device A 102. According to the method 400, wireless device B 104 performs periodic page scans in an attempt to receive a page from wireless device A 102 (block 402). Wireless device B 104 may perform the periodic page scans with a period $T_1$.

Wireless device B 104 may determine one or more characteristics of the page operations performed by wireless device A 102 (block 404). For example, if wireless device A 102 performs periodic page operations, wherein each page operation comprises an interval for transmitting a page and another interval for scanning for a page response, the determined one or more characteristics may include one or more of the following: the duration X of the page transmission interval, the duration Y of the response scan interval, and the rate difference C between the rate at which the page operations are performed and a rate at which the page scans are performed. Wireless device B 104 may determine the one or more characteristics of the page operations in a number of ways, for example, through a discovery or other type of procedure performed with wireless device A 102 or by accessing information in a standard that specifies the one or more characteristics of the page operations performed by wireless device A 102. Wireless devices A 102 and B 104 may have performed the discovery or other procedure during a communication session prior to both devices commencing the paging operations and page scans, respectively.

Then, in accordance with the method 400, wireless device B 104 arranges the performing of the page scans based on the one or more determined characteristics of the page operations performed by wireless device A 102 (block 406). For example, as previously discussed, wireless device 104 B may adjust or set the period of the periodic page scans in accordance with Eq. 1 or 3. In this regard, wireless device B 104 may adjust or set the period of the periodic page scans based on the duration X of the page transmission interval. Alternatively, or in addition to, wireless device B 104 may adjust or set the period of the periodic page scans based on the duration Y of the response scan interval. Alternatively, or in addition to, wireless device B 104 may adjust or set the period of the periodic page scans based on the rate difference between the rate at which the page operations are performed and the rate at which the page scans are performed.

As a consequence of applying the adjustment to the period of the periodic page scans, wireless device B 104 is able to ensure that one of the following two consecutive page scans occurs during the transmission of the page by wireless device A 102. For many situations, this has the effect of substantially reducing the delay D associated with wireless device A 102 successfully receiving a page response from wireless device B 104. The following example illustrates the benefits of adjusting the period of the page scans from a timing perspective.

Figure 5:
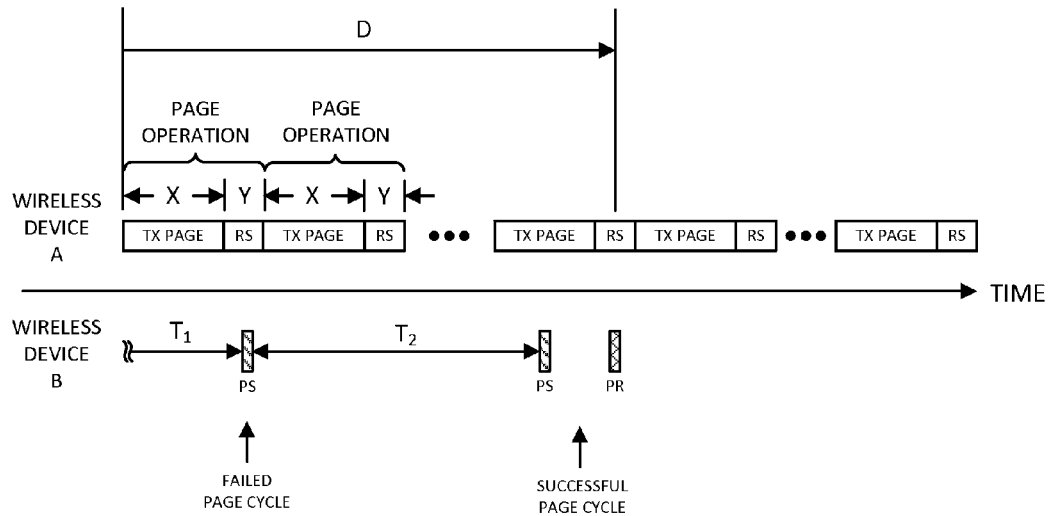
FIG. 5 illustrates a timing diagram related to an exemplary method of scanning for a page from a remote device in accordance with another aspect of the disclosure.

FIG. 5 illustrates a timing diagram related to an exemplary method of scanning for a page from a remote device in accordance with another aspect of the disclosure. The timing diagram is similar to the timing diagram illustrated in FIG. 2, previously discussed. In this example, wireless device B 104 adjusts the period associated with its periodic page scans in accordance with Eq. 1 discussed above, in order to ensure that one of two consecutive page scans occurs during the page transmission interval X. In this example, the initial conditions are that wireless device A 102 performs periodic page operations, each page operation comprising a page transmission interval with a duration X and a response scan interval with a duration Y, and that wireless device B 104 is performing periodic page scans with a period $T_1$.

While performing the periodic page scans with a period $T_1$, wireless device B 104 determines that an adjustment of the period $T_1$ of the page scans is needed to ensure that one of the following two consecutive page scans occurs during the transmission of the page by wireless device A 102. As previously discussed, the basis for the adjustment may have been based on newly determined one or more characteristics of the page operations performed by wireless device A 102. Or, the basis for the adjustment may have been that the initial period $T_1$ was a default setting or configured for scanning for a page from another device, and that during the course of performing the initial page scans, wireless device B 104 detected the presence of wireless device A 102, and consequently, adjusted the period $T_1$ in order to ensure that one of the following two consecutive page scans occurs during the transmission of the page by wireless device A 102.

In this example, wireless device B 104 modifies the initial period $T_1$ of the periodic page scans to new period $T_2$ in accordance with Eq. 1 or 3. As illustrated in the exemplary timing diagram, the first page scan (PS) associated with the adjusted period $T_2$ occurs during the response scan (RS) performed by wireless device A 102. Accordingly, since both devices are scanning or listening at the same time, wireless device B 104 fails to receive the page transmitted by wireless device A 102. However, because of the adjusted period $T_2$ of the page scans, the following page scan (PS) occurs during the transmission of a page by wireless device A 102. Accordingly, wireless device B 104 receives the page from wireless device A 102, and transmits a page response (PR) during the following response scan (RS) performed by wireless device A 102. As a comparison, in the example of FIG. 2 where wireless device B 104 did not adjust the period of the page scans, a successful page operation occurred pursuant to the fourth indicated page scan (PS) performed by wireless device B 104. Whereas, in the instant example of FIG. 5 wherein wireless device B 104 adjusted the period of the page scans in accordance with Eq. 1 or 3, a successful page operation occurred pursuant to the second indicated page scan (PS) performed by wireless device B 104. Thus, the delay D associated with wireless device A 102 successfully receiving a page response from wireless device B 104 has been substantially shortened due to the adjustment of the period of the page scans by wireless device B 104.

The adjustment of the period of the page scans by wireless device B 104 may have been performed in response to detecting a different wireless device. For example, the initial period $T_1$ of the page scans discussed above with reference to the example of FIG. 5 may have been configured for scanning for a page from another device. Upon detecting wireless device A 102, wireless device B 104 modifies the period of the page scans to $T_2$ based on one or more characteristics of the page operations of wireless device A 102 in order to ensure that one of two consecutive page scans occurs during the transmission of a page by wireless device A 102. This is explained in further detail with reference to the following example.

Figure 6:
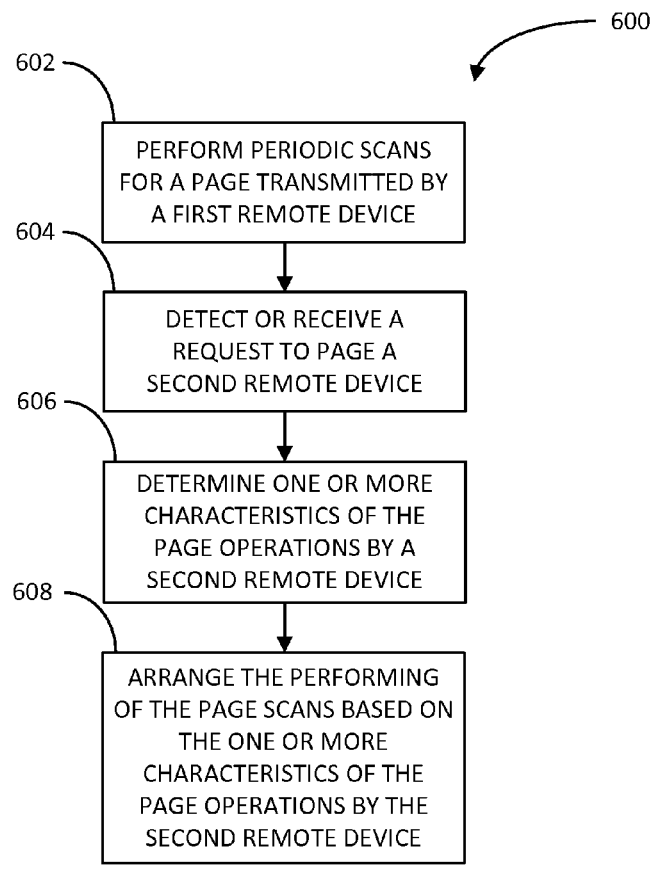
FIG. 6 illustrates a flow diagram of an exemplary method of scanning for a page from a new remote device in accordance with another aspect of the disclosure.

FIG. 6 illustrates a flow diagram of an exemplary method 600 of scanning for a page from a remote device in accordance with another aspect of the disclosure. According to the method 600, wireless device B 104 performs periodic scans for a page transmitted by a first remote device (block 602). As an example, wireless device B 104 performs the periodic page scans with a period of $T_1$, which was based on one or more characteristics of page operations performed by the first remote device.

Then, according to the method 600, wireless device B 104 either detects a second remote device or receives an indication that the second remote device is attempting to page wireless device B 104 (block 604). In response to detecting or receiving the paging indication, wireless device B 104 determines one or more characteristics of page operations performed by the second remote device (block 606). As previously discussed, this may be accomplished by way of a previous discovery or other procedure performed with the second remote device, or by accessing information related to a standard that specifies parameters of the paging operations performed by the second remote device. Also, as previously discussed, such one or more characteristics of the page operations of the second remote device may include the duration X of the page transmission interval, the duration Y of the response scan interval, and the rate difference C between the rate at which page operations are performed by the second remote device and the rate at which page scans are performed by wireless device B 104.

Then, according to the method 600, wireless device B 104 arranges the performance of the page scans based on the one or more characteristics of the second remote device (block 608). As an example, wireless device B 104 adjusts the period of the page scans from $T_1$ to $T_2$, where the period $T_2$ is based on one or more of the following: the duration X of the page transmission interval of the second remote device, the duration Y of the response scan interval of the second remote device, and the rate difference C between the rate at which page operations are performed by the second remote device and the rate at which page scans are performed by wireless device B 104. More specifically, wireless device B 104 may adjust the period of the page scans in accordance with Eq. 1 or 3, previously discussed.

The technique described herein of shortening the delay associated with wireless device A 102 successfully receiving a page response from wireless device B 104 is not limited to wireless device B 104 arranging the performance of the page scans so that one of two consecutive page scans occurs during the transmission of a page by wireless device A 102. As discussed further herein, the technique is applicable to wireless device A 102 arranging the performance of page operations so that so that one of two consecutive page scans performed by wireless device B 104 occurs during the transmission of a page by wireless device A 102.

Figure 7:
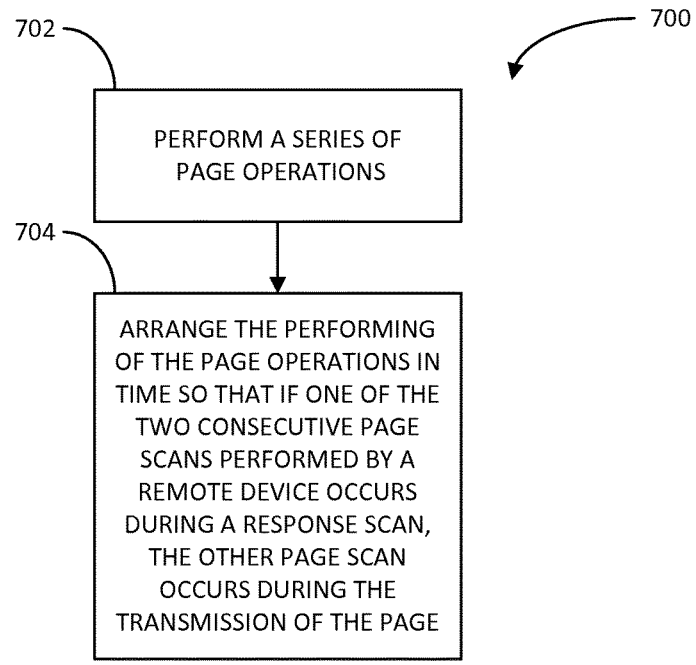
FIG. 7 illustrates a flow diagram of an exemplary method of paging a remote device in accordance with another aspect of the disclosure.

FIG. 7 illustrates a flow diagram of an exemplary method 700 of paging a remote device in accordance with another aspect of the disclosure. The operations of the method 700 may be implemented by wireless device A 102 in attempting to successfully page wireless device B 104. According to the method 700, wireless device A 102 performs a series of page operations, wherein each page operation comprises transmitting a page and scanning for a page response (block 702). Further, in accordance with the method 700, wireless device A 102 arranges the performing of the page operations so that if one of two consecutive page scans performed by wireless device B 104 occurs during a response scan performed by wireless device A 102, the other of the two consecutive page scans performed by wireless device B 104 occurs during the transmission of a page by wireless device A 102 (block 704).

As discussed in more detail herein, based on knowledge of the page scans performed by wireless device B 104, wireless device A 102 may adjusts any number of parameters of the page operations to ensure that one of two consecutive page scans performed by wireless device B 104 occurs during the transmission of a page by wireless device A 102. If wireless device B 104 is able to receive a page from wireless device A 102 no later than the second page scan of two consecutive page scans, and wireless device B 104 is able to transmit a page response to wireless device A 102 within a predetermined time interval after receiving the page, the maximum delay associated with performing a successful operation may be configured to be relatively short.

As an example, wireless device A 102 performs periodic page operations, wherein each page operation includes a transmission of a page and a scan for a page response from wireless device B 104. As in the previous examples, the duration of the transmission of the page may be represented as X, and the duration of the scan for the page response may be represented as Y. Also, as in the previous examples, the duration X is greater than the duration Y. Additionally, as in the previous examples, wireless device B 104 performs periodic scans for the page. Based on these exemplary conditions, wireless device A 102 can ensure that one of two consecutive page scans performed by wireless device B 104 occurs during the transmission of a page by wireless device A 102 if wireless device A 102 sets or adjusts one or more of the following: the duration X of the page transmission interval, the duration Y of the response scan interval, or both the durations X and Y, in accordance with Eq. 1, previously discussed.

Accordingly, rewriting Eq. 1, wireless device A 102 may set or adjust the duration X of the page transmission interval in accordance with the following relationship to ensure that one of two consecutive page scans performed by wireless device B 104 occurs during the transmission of a page by wireless device A 102:

$$X = \frac{T}{\left(n + \frac{1}{2}\right)} - Y \qquad \text{Eq. 4}$$

Alternatively, rewriting Eq. 1, wireless device A 102 may set or adjust the duration Y of the response scan interval in accordance with the following relationship to ensure that one of two consecutive page scans performed by wireless device B 104 occurs during the transmission of a page by wireless device A 102:

$$Y = \frac{T}{\left(n + \frac{1}{2}\right)} - X \qquad \text{Eq. 5}$$

Alternatively, rewriting Eq. 1, wireless device A 102 may set or adjust the sum of both the duration X of the page transmission interval and the duration Y of the response scan interval in accordance with the following relationship to ensure that one of two consecutive page scans performed by wireless device B 104 occurs during the transmission of a page by wireless device A 102:

$$X + Y = \frac{T}{\left(n + \frac{1}{2}\right)} \qquad \text{Eq. 6}$$

wherein, as previously discussed, T is the period of the page scans performed by wireless device B 104, n is an integer, X is the duration of the transmission of a page, and Y is the duration of the scan for a page response.

In the situation where there exists a rate difference C between the rate at which page operations are performed by wireless device A 102 and the rate at which page scans are performed by wireless device B 104, wireless device A 102 may configure the duration X of the page transmission interval in accordance with Eq. 4, the duration Y of the response scan interval in accordance with Eq. 5, or the sum of both the duration X of the page transmission interval and the duration Y of the response scan interval in accordance with Eq. 6, and still ensure that one of two consecutive page scans occurs during the transmission of a page if Eq. 2, previously discussed, is satisfied. Thus, if the rate difference C may be constrained by specification or by a synchronization procedure performed by the two devices 102 and 104, then wireless device A 102 may ensure that one of two consecutive page scans occurs during the transmission of a page by adjusting X, Y, or both X and Y in accordance with Eqs. 4-6, respectively.

In the other scenario where, for example, the rate difference C is not able to be constrained in accordance with Eq. 2, wireless device A 102 may be able to determine the rate difference C through a procedure conducted with wireless device B 104, and then adjusts the duration X of the page transmission interval, the duration Y of the response scan interval, or both the duration X of the page transmission interval and the duration Y of the response scan interval, based on the determined rate difference C. For instance, given a rate difference C, wireless device A 102 may ensure that one of two consecutive page scans occurs during the transmission of a page by setting the adjusted duration X of the page transmission interval in accordance with the following relationship:

$$X_{adj} = X - \frac{T \cdot C}{n} \qquad \text{Eq. 7}$$

where X is the duration of the page transmission interval given by Eq. 4. Alternatively, given a rate difference C, wireless device A 102 may ensure that one of two consecutive page scans occurs during the transmission of a page by setting the adjusted duration Y of the response scan interval in accordance with the following relationship:

$$Y_{adj} = Y - \frac{T \cdot C}{n} \qquad \text{Eq. 8}$$

where Y is the duration of the response scan interval given by Eq. 5. Alternatively, given a rate difference C, wireless device A 102 may ensure that one of two consecutive page scans occurs during the transmission of a page by setting the adjusted sum of the duration X of the page transmission interval and the duration Y of the response scan interval in accordance with the following relationship:

$$(X + Y)_{adj} = (X + Y) - \frac{T \cdot C}{n} \qquad \text{Eq. 9}$$

where (X+Y) is the sum of the duration X of the page transmission interval and Y is the duration of the response scan interval given by Eq. 6. Based on the aforementioned concepts, the following provides an example of a more detailed method of scanning for a page from a remote device.

Thus, if wireless device A 102 determines that the rate difference C satisfies Eq. 2, wireless device A 102 may configure the duration X of the page transmission interval, the duration Y of the response scan interval, or both durations X and Y in accordance with Eq. 4, 5, or 6, respectively.

If, on the other hand, wireless device A 102 determines that the rate difference C does not satisfy Eq. 2, wireless device A 102 may configure the duration X of the page transmission interval, the duration Y of the response scan interval, or both durations X and Y in accordance with Eq. 7, 8, or 9, respectively. Based on the aforementioned concepts, the following provides an example of a more detailed method of paging a remote device.

Figure 8:
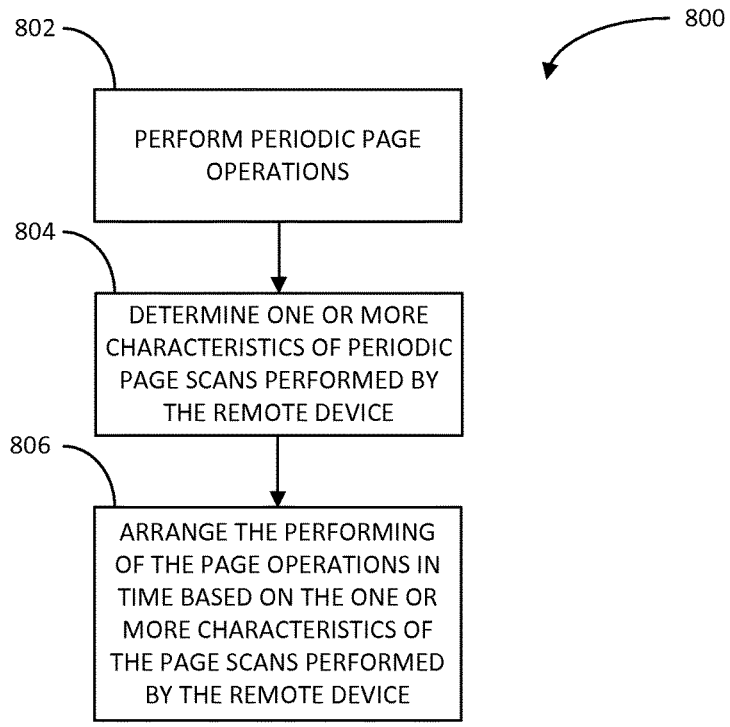
FIG. 8 illustrates a flow diagram of another exemplary method of paging a remote device in accordance with another aspect of the disclosure.

FIG. 8 illustrates a flow diagram of an exemplary method 800 of paging a remote device in accordance with another aspect of the disclosure. The operations of the method 800 may be implemented by wireless device A 102 in attempting to receive a page response from wireless device B 104. According to the method 800, wireless device A 102 performs periodic page operations, wherein each page operation comprises transmitting a page and scanning for a page response from wireless device B 104 (block 802).

During the performance of the periodic page operations, wireless device A 102 may determine one or more characteristics of the page scans performed by wireless device B 104 (block 804). For example, if wireless device B 104 performs periodic page scans, the determined one or more characteristics may include the period T of the periodic page scans. Wireless device A 102 may determine the one or more characteristics of the page scans in a number of ways, for example, through a discovery or other type of procedure performed with wireless device B 104 or by accessing information in a standard that specifies the one or more characteristics of the page scans performed by wireless device B 104. Wireless devices A 102 and B 104 may have performed the discovery or other procedure during a communication session prior to both devices commencing the paging operations and page scans, respectively.

Then, in accordance with the method 800, wireless device A 102 arranges the performing of the page operations based on the one or more determined characteristics of the page scans performed by wireless device B 104 (block 806). For example, as previously discussed, wireless device 102 A may set or adjust the duration X of the page transmission interval based on the one or more determined characteristics of the page scans performed by wireless device B 104. Alternatively, wireless device 102 A may set or adjust the duration Y of the response scan interval based on the one or more determined characteristics of the page scans performed by wireless device B 104. Alternatively, wireless device 102 A may set or adjust both the duration X of the page transmission interval and the duration Y of the response scan interval based on the one or more determined characteristics of the page scans performed by wireless device B 104.

As a consequence of applying the adjustment to the periodic page operations, wireless device A 102 is able to ensure that one of the following two consecutive page scans performed by wireless device B 104 occurs during the transmission of a page by wireless device A 102. For many situations, this has the effect of substantially reducing the delay D associated with wireless device A 102 successfully receiving a page response from wireless device B 104. The following examples illustrate the benefits of adjusting the page operations from a timing perspective.

Figure 9A:
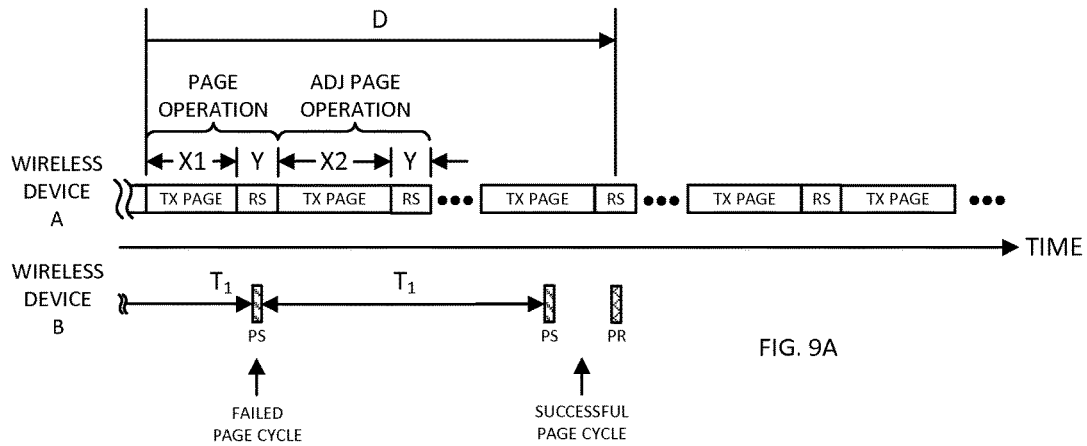
FIGS. 9A-D illustrate timing diagrams related to various exemplary methods of paging a remote device in accordance with another aspect of the disclosure.

FIG. 9A illustrates a timing diagram related to an exemplary method of paging a remote device in accordance with another aspect of the disclosure. The timing diagram is similar to the timing diagram illustrated in FIG. 2, previously discussed. In this example, wireless device A 102 arranges or adjusts a timing of page operations so that if one of two consecutive periodic page scans performed by wireless device B 104 occurs during one of the page response scans, the other of the two consecutive periodic page scans occurs during the transmission of one of the page. And, more specifically, in this example, wireless device A 102 adjusts the duration of the page transmission interval so that one of two consecutive page scans occurs during the transmission of the page. Further, in accordance with this example, wireless device B 104 is performing periodic page scans with a period of $T_1$.

In particular, prior to the timing adjustment, wireless device A 102 configured each page operation with a page transmission interval having a duration X1 and a response scan interval having a duration Y. While performing the page operations with the X1 and Y settings, wireless device A 102 determines that a timing adjustment of the page operations is needed. As previously discussed, the basis for the adjustment may have been based on a newly determined one or more characteristics of page scans performed by wireless device B 104. Or, the basis for the adjustment may have been that the initial settings X1 and Y were default settings or configured for paging another device, and that during the course of performing the initial page operations, wireless device A 102 detected the presence of wireless device B 104, and consequently, adjusted the timing of the page operations based on one or more characteristics (e.g., period $T_1$) of the page scans performed by wireless device B 104.

In this example, wireless device A 102 adjusts the duration of the transmission of the page from X1 to X2 (e.g., where X2>X1). Thus, the adjusted page operation comprises a page transmission interval with a duration X2 and a response scan interval with a duration Y (in this example, the page scan duration Y was not changed). The adjustment of the duration of the page transmission interval to X2 may have been based on Eq. 4 or 7, previously discussed. As a result of the adjustment to the page operations, wireless device A 102 ensures that at least one of two consecutive page scans performed by wireless device B 104 occur during the transmission of a page by wireless device A 102. Thus, as shown in FIG. 9A, the first page scan (PS) performed by wireless device B 104 occurred during a response scan (RS) performed by wireless device A 102. However, the following consecutive page scan (PS) performed by wireless device B 104 occurred during the transmission of a page by wireless device A 102. Thus, in comparison with the example of FIG. 2, the delay D associated with wireless device A 102 successfully receiving a page response from wireless device B 104 has been substantially shortened due to the adjustment of the page operations by wireless device A 102.

Figure 9B:
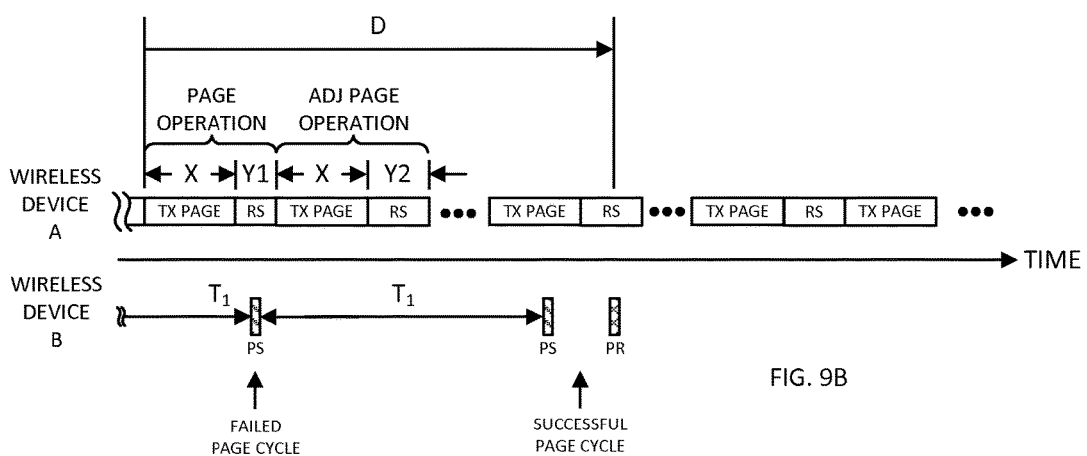

FIG. 9B illustrates a timing diagram related to another exemplary method of paging a remote device in accordance with another aspects of the disclosure. In the previous example of FIG. 9A, wireless device A 102 adjusted the duration X of the transmission of the page. In this example, wireless device A 102 adjusts the duration of the scanning for the page response. As shown, the initial page operation has a page transmission duration of X and a response scan duration of Y1. After the timing adjustment, the adjusted page operation has a page transmission duration of X and a response scan duration of Y2. The adjustment of the duration of the response scan interval to Y2 may have been based on Eq. 5 or 8, previously discussed. Similarly, in comparison with the example of FIG. 2, the delay D in wireless device A 102 receiving a successful page response from wireless device B 104 may be substantially shortened due to the adjustment of the page operations.

Figure 9C:
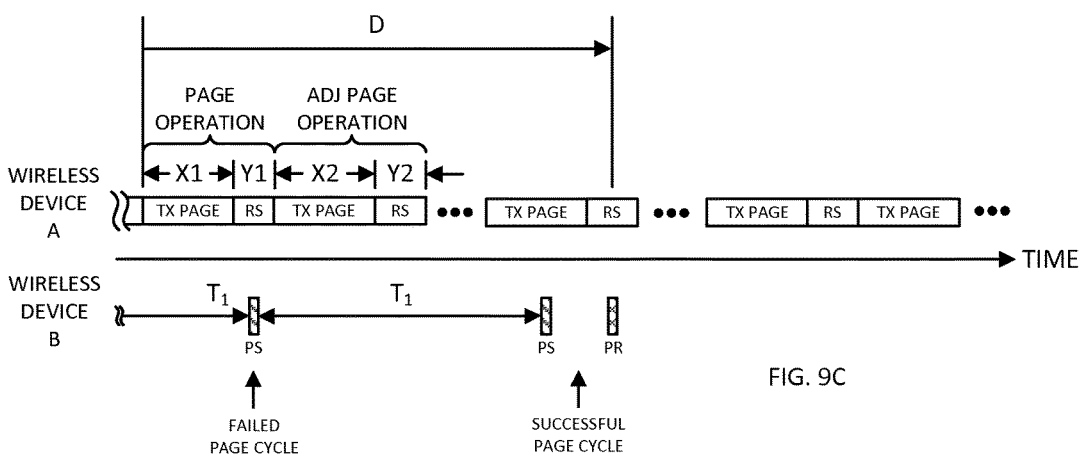

FIG. 9C illustrates a timing diagram related to another exemplary method of paging a remote device in accordance with another aspects of the disclosure. In the previous examples of FIGS. 9A and 9B, wireless device A 102 either adjusted the duration X of the transmission of the page or adjusted the duration Y of the response scan. In this example, wireless device A 102 adjusts both the duration X of the transmission of the page and duration Y of the scanning for the page response. As shown, the initial page operation has a page transmission duration of X1 and a response scan duration of Y1. After the timing adjustment, the adjusted page operation has a page transmission duration of X2 and a response scan duration of Y2. The adjustment of the duration of the page transmission interval and duration of the response scan interval to X2 and Y2, respectively, may have been based on Eq. 6 or 9, previously discussed. Similarly, in comparison with the example of FIG. 2, the delay D in wireless device A 102 receiving a successful page response from wireless device B 104 may be substantially shortened due to the adjustment of the page operations.

Figure 9D:
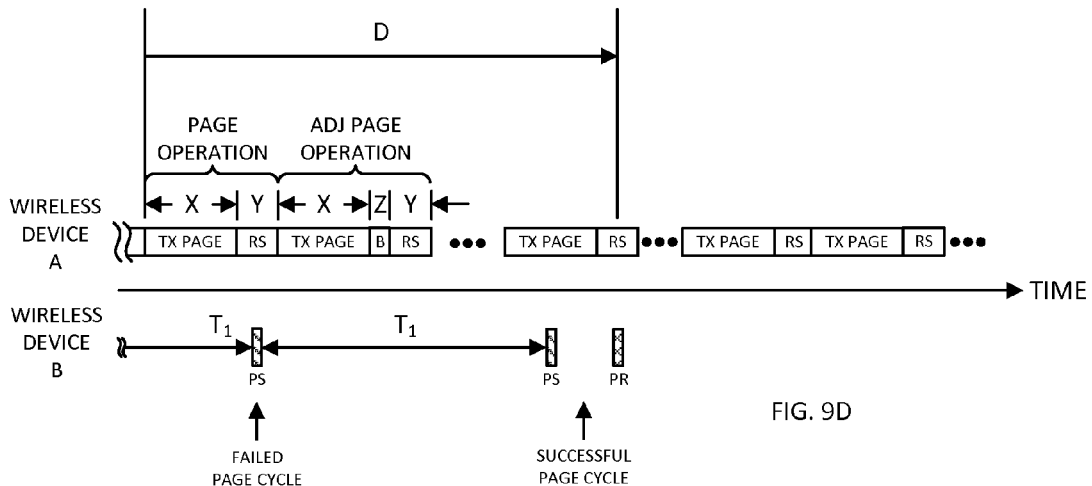

FIG. 9D illustrates a timing diagram related to another exemplary method of paging a remote device in accordance with another aspect of the disclosure. In the previous examples of FIGS. 9A-C, wireless device A 102 adjusted the duration X of the transmission of the page, the duration Y of the scanning for the page response, and both durations X and Y, respectively. In this example, wireless device A 102 applies an offset to the page operations by inserting a blank interval Z in one or more page operations. As shown, the initial page operation has a page transmission duration of X and a response scan duration of Y. The adjusted page operation has a blank interval Z in addition to the page transmission interval X and the response scan interval Y. During the blank interval Z, wireless device A 102 may cease both transmitting the page and scanning for the page response. The blank interval Z may be inserted between the page transmission and response scan as shown, or between page operations.

To ensure that one of two consecutive page scans performed by wireless device B 104 occurs during the transmission of a page performed by wireless device A 102, wireless device A 102 may configure the duration Z of the blank interval in each page operation in accordance with the following relationship:

$$Z = \frac{T}{\left(n + \frac{1}{2}\right)} - (X + Y) \qquad \text{Eq. 10}$$

where, as previously discussed, Z is the duration of the blank interval, X is the duration of the page transmission interval, Y is the duration of the page scan interval, T is the period of the periodic page scans, and n is an integer. In the case where a rate difference C between the rate at which page operations are performed by wireless device A 102 and the rate at which page scans are performed by wireless device B 104 is to be considered, the adjusted duration $Z_{adj}$ of the blank interval may be configured in accordance with the following relationship:

$$Z_{adj} = Z - \frac{T \cdot C}{n} \qquad \text{Eq. 11}$$

where Z is the duration of the blank interval as given by Eq. 10. Similarly, in comparison with the example of FIG. 2, the delay D in wireless device A 102 receiving a successful page response from wireless device B 104 may be substantially shortened due to the adjustment of the page operations.

In the previous example, each page operation included a blank interval having a duration of Z in accordance with Eq. 10 or $Z_{adj}$ in accordance with Eq. 11 to ensure that at least one of two consecutive page scans performed by wireless device B 104 occurs during a transmission of one of the pages by wireless device A 102. However, every page operation need not have a blank interval to effectuate the time shift of the page operations over a period of the periodic page scans to ensure that at least one of two consecutive page scans occurs during a transmission of a one page. Any number of blank intervals with the same or distinct durations may be inserted in the series of page operations to effectuate the time shift. In this regard, the quantity, duration or both the quantity and duration of the one or more blank intervals inserted in the series of page operations may be based on the period T of the periodic page scans to achieve the time shift to ensure that at least one of two consecutive page scans occurs during a transmission of a one page.

Figure 10:
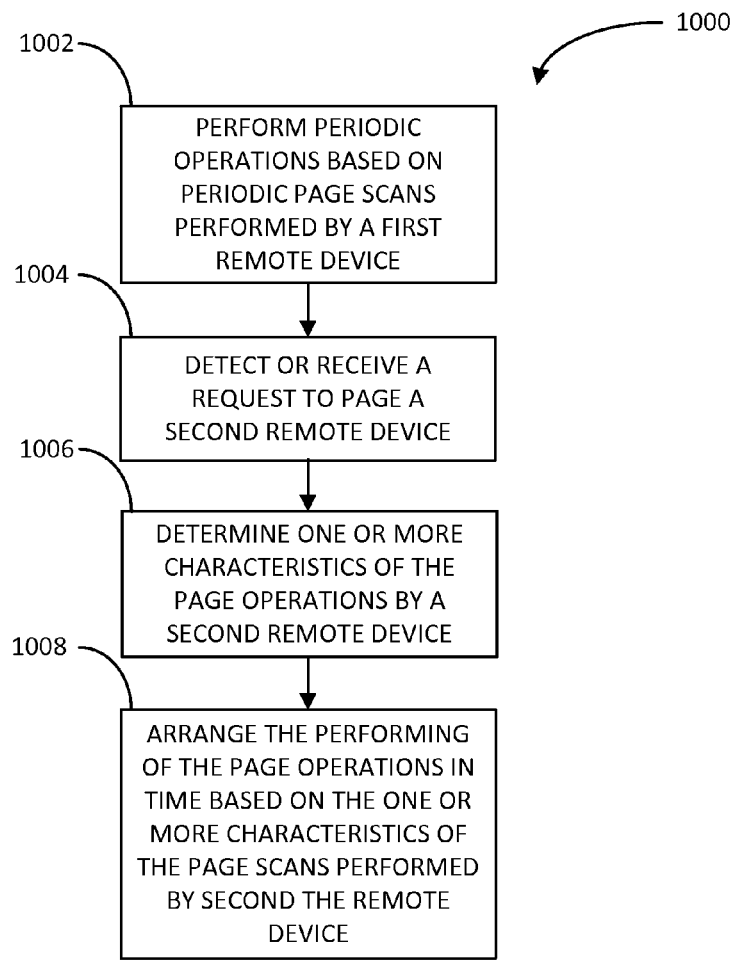
FIG. 10 illustrates a flow diagram of an exemplary method of paging a new remote device in accordance with another aspect of the disclosure.

FIG. 10 illustrates a flow diagram of an exemplary method 1000 of paging a remote device in accordance with another aspect of the disclosure. According to the method 1000, wireless device A 102 performs periodic page operations in an attempt to page a first remote device (block 1002). As an example, wireless device A 102 performs the periodic page operations, wherein each page operation comprises transmitting a page and scanning for a page response.

Then, according to the method 1000, wireless device A 102 either detects a second remote device or receives a request to page a second remote device (block 1004). In response to detecting or receiving a request to page the second remote device, wireless device A 102 determines one or more characteristics of page scans performed by the second remote device (block 1006). As previously discussed, this may be accomplished by way of a previous discovery or other procedure performed with the second remote device, or by accessing information related to a standard that specifies parameters of the page scans performed by the second remote device. Also, as previously discussed, such one or more characteristics of the page scans of the second remote device includes the period T associated with the periodic page scans, and the rate difference C between the rate at which page operations are performed by wireless device A 102 and the rate at which page scans are performed by the second remote device.

Then, according to the method 1000, wireless device A 102 arranges the performance of the page operations based on the one or more characteristics of the second remote device (block 1008). As an example, wireless device A 102 may adjust the duration X of the page transmission interval based on the period of the periodic page scans performed by the second remote device, and/or the rate difference C between the rate at which page operations are performed by wireless device A 102 and the rate at which page scans are performed by the second remote device. More specifically, wireless device A 102 may adjust the duration X in accordance with Eq. 4 or 7, previously discussed. Alternatively, wireless device A 102 may adjust the duration Y of the response scan interval based on the period of the periodic page scans performed by the second remote device, and/or the rate difference C between the rate at which page operations are performed by wireless device A 102 and the rate at which page scans are performed by the second remote device. More specifically, wireless device A 102 may adjust the duration Y in accordance with Eq. 5 or 8, previously discussed.

Alternatively, wireless device A 102 may adjust both the duration X of the page transmission interval and duration Y of the response scan interval based on the period of the periodic page scans performed by the second remote device, and/or the rate difference C between the rate at which page operations are performed by wireless device A 102 and the rate at which page scans are performed by the second remote device. More specifically, wireless device A 102 may adjust both the durations X and Y in accordance with Eq. 6 or 9, previously discussed. Alternatively, wireless device A 102 may insert blank intervals Z into respective page operations based on the period of the periodic page scans performed by the second remote device, and/or the rate difference C between the rate at which page operations are performed by wireless device A 102 and the rate at which page scans are performed by the second remote device. More specifically, wireless device A 102 may insert blank intervals Z into respective page operations in accordance with Eq. 10 or 11, previously discussed.

Another technique of controlling or reducing a delay associated with wireless device A 102 successfully paging wireless device B 104 involves wireless device B 104 performing a series of sets of separate page scans, wherein a first time interval between the separate page scans is less than a second time interval between the sets of separate page scans. The separate scans within a set may be configured such that at least one of the separate scans occurs during a transmission of a page by wireless device A 102. For example, in the case where wireless device A 102 generates a series of page operations, wherein each page operation comprises transmitting a page and a scanning for a page response, and the duration X of the page transmission interval is greater than the duration Y of the response scan interval, wireless device B 102 may configure the first time interval between separate scans in a set to be greater than the duration Y of the response scan interval and less than the duration X of the page transmission interval to ensure that one of the separate scans in the set occurs during the transmission of a page by wireless device A. This is further explained with reference to the following exemplary timing diagram.

Figure 11:
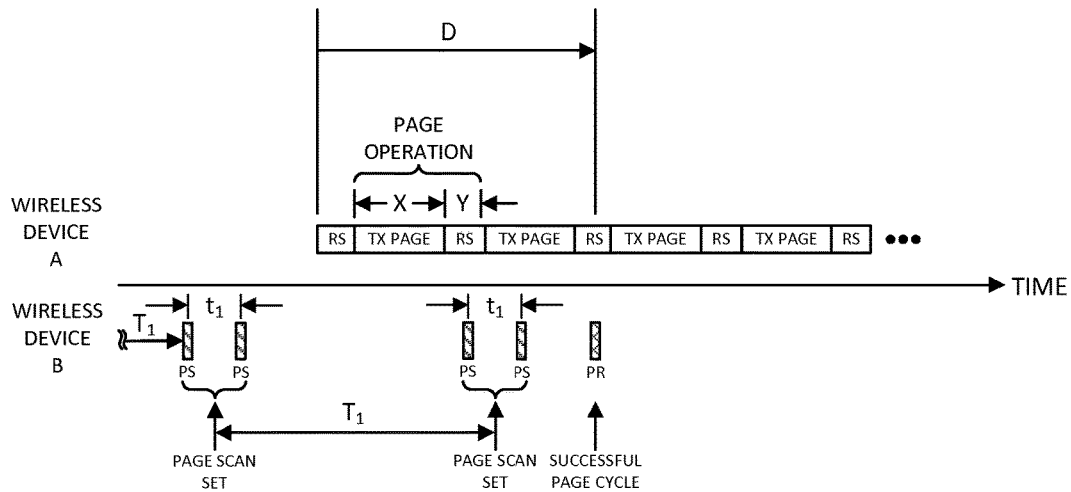
FIG. 11 illustrates a timing diagram related to another exemplary method of scanning for a page from a remote device in accordance with another aspect of the disclosure.

FIG. 11 illustrates a timing diagram related to an exemplary method of scanning for a page transmitted by a remote device in accordance with another aspect of the disclosure. The timing diagram is similar to the timing diagrams previously discussed. According to this example, wireless device A 102 is performing periodic and consecutive page operations, wherein each page operation comprises transmitting a page for a time interval having a duration X and scanning for a page response for a time interval having a duration Y. Wireless device B 104, on the other hand, is performing periodic sets of separate page scans. In this example, each set consists of two separate scans spaced apart by a time interval $t_1$. It shall be understood that each set may include more than two separate page scans. Also, in accordance with this example, the sets of separate page scans are performed in a periodic manner with a period of $T_1$.

In this example, wireless device B 104 may ensure that at least one of the separate page scans in a set occurs during the transmission of a page by wireless device A 102 if the following conditions are met: (1) the duration X of the page transmission interval is greater than the duration Y of the response scan interval employed by wireless device A 102; (2) the time interval $t_1$ between the separate page scans in a set is greater than the duration Y of the response scan interval; and (3) the time interval $t_1$ between the separate page scans in a set is less than the duration X of the page transmission interval. These conditions ensure that if a first page scan in a set occurs during a response scan interval, the second page scan in the set occurs during the page transmission interval.

As illustrated in the example of FIG. 11, prior to wireless device A 102 coming within signal range of wireless device B 104 or prior to wireless device A 102 commencing page operations for wireless device B 104, wireless device B 104 is performing periodic sets of separate page scans (PS) with a period $T_1$ and a time interval $t_1$ between the separate page scans (PS) in a set, wherein time interval between sets of page scans or the period $T_1$ is greater than the time interval $t_1$ between the separate page scans (PS) in a set. As illustrated, at a particular time, wireless device A 102 comes within signal range of wireless device B 104 or commences page operations for wireless device B 104. As shown, in this example, the first page scan (PS) in the second illustrated set occurs during a response scan (RS) interval. However, the second page scan (PS) in the second illustrated set occurs during the page transmission interval.

Accordingly, wireless device B 104 receives the page from wireless device A 102, and a predetermined time interval thereafter, wireless device B 104 transmits a page response (PR) to the wireless device A 102 while device 102 is performing a response scan (RS). Thus, wireless device A 102 successfully receives a page response (PR) from wireless device B 104. As shown, the delay D between the time wireless device A 104 commenced paging operations or came within signal range of wireless device B 104 to the time wireless device A 102 successfully receives a page response (PR) from wireless device B 104 is less than the period $T_1$ of the periodic sets of separate scans performed by wireless device B 104. This is because each set of separate scans is configured such that one of the page scans occurs during the transmission of a page by wireless device A 102. If, in this example, the first or an early scan in a set occurred during the transmission of a page, then subsequent one or more scheduled scans of the set may be cancelled (i.e., not performed). The following describes various methods of implementing the aforementioned concepts regarding performing sets of separate scans by wireless device B 102.

Figure 12:
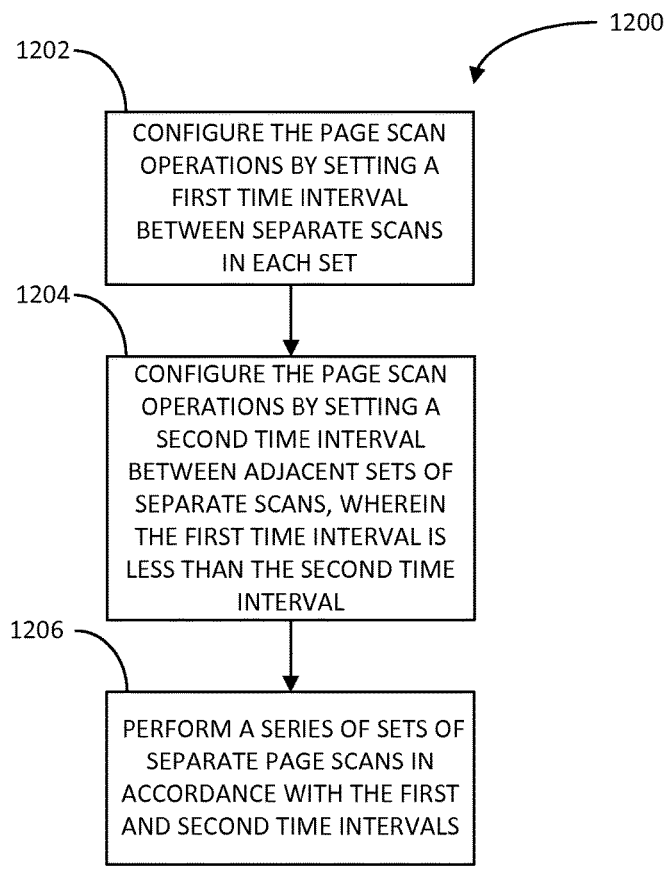
FIG. 12 illustrates a flow diagram of another exemplary method of scanning for a page from a remote device in accordance with another aspect of the disclosure.

FIG. 12 illustrates a flow diagram of an exemplary method 1200 of scanning for a page transmitted by a remote device in accordance with another aspect of the disclosure. The method 1200 may be implemented by wireless device B 104 in attempting to receive a page from wireless device A 102. According to the method 1200, wireless device B 104 configures the page scan operations by setting a first time interval between separate scans in each set (block 1202). Wireless device B 104 may set the first time interval in accordance with a default setting or based on one or more characteristics of page operations performed by a remote device, such as wireless device A 102. Such one or more characteristics may include the duration X of the page transmission interval of the page operations and the duration Y of the response scan interval of the page operations.

Further, in accordance with the method 1200, wireless device B 104 configures the page scan operations by setting a second time interval between adjacent sets of separate scans, wherein the first time interval between separate scans of each set is less than the second time interval between adjacent sets of separate scans (block 1204). Wireless device B 104 may set the second time interval in accordance with a default setting or based on one or more characteristics of page operations performed by a remote device, such as wireless device A 102. For example, the second time interval may be a function of a duration (e.g., X+Y) of each page operation performed by wireless device A 102.

Then, according to the method 1200, wireless device B 104 performs a series of sets of page scans in accordance with the first and second time intervals (block 1206). Wireless device B 104 may perform the series of sets of page scans in a periodic manner. In such a case, the second time interval remains substantially constant from set-to-set. Alternatively, wireless device B 104 may vary the second time interval. The variation of the second time interval may be responsive to detecting a different remote device, as discussed further herein. Similarly, wireless device B 104 may maintain the first time interval substantially constant from set-to-set. Alternatively, wireless device B 104 may vary the first time interval. The variation of the first time interval may be responsive to detecting a different remote device, as discussed further herein.

Figure 13:
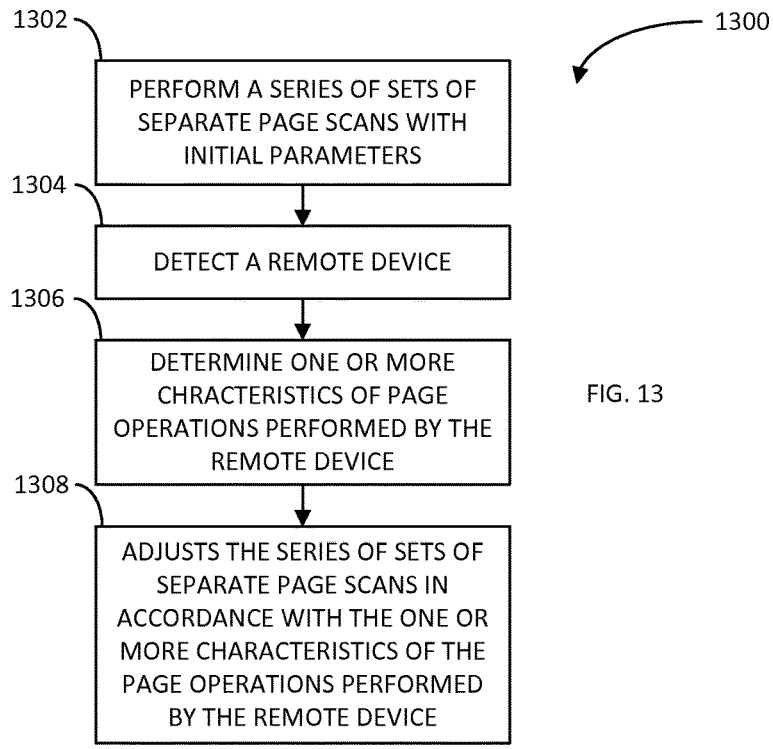
FIG. 13 illustrates a flow diagram of another exemplary method of scanning for a page from a remote device in accordance with another aspect of the disclosure.

FIG. 13 illustrates a flow diagram of another exemplary method 1300 of scanning for a page transmitted by a remote device in accordance with another aspect of the disclosure. The method 1300 may be implemented by wireless device B 104 in attempting to receive a page from wireless device A 102 (e.g., the remote device). According to the method 1300, wireless device B 104 performs a series of sets of separate page scans in accordance with initial parameters (block 1302). The initial parameters may specify that the sets of separate page scans are performed in a periodic manner, the period $T_1$ associated with the periodic sets of separate page scans, and the time interval $t_1$ between separate scans in a set. These initial parameters may have been preconfigured default settings.

Then, according to the method 1300, wireless device B 104 detects the presence of wireless device A 102, or that wireless device A 102 is attempting to page wireless device B 104 (block 1304). In response to detecting the remote device, wireless device B 104 determines one or more characteristics of the page operations performed by the wireless device A 102 (block 1306). The one or more characteristics may include one or more of the following: a rate at which page operations are performed, a duration of the transmission of a page of each page operation, and a duration of the scan for a page response of each page operation. Wireless device B 104 may have determined the one or more characteristics of the page operations of the remote device pursuant to a previous communication session between wireless device B 104 and the wireless device A 102.

Then, according to the method 1300, wireless device B 104 adjusts the sets of separate page scans in accordance with the one or more characteristics of the page operations performed by wireless device A 102 (block 1308). For example, wireless device B 104 may adjust the time period $t_1$ between separate page scans in a set to be greater than a duration of the response scan performed by wireless device A 102, and less than the duration of the page transmission performed by wireless device A 102. Alternatively, or in addition to, wireless device B 104 may adjust the period $T_1$ associated with periodic sets of separate page scans based on a rate at which the page operations are performed. Wireless device B 104 may perform the adjustment in order to ensure that one of the page scans in a set occurs during the transmission of a page by wireless device A 102. Accordingly, wireless device B 104 is able to receive the page, and send a page response to wireless device A 102 in order to successfully complete the paging procedure.

Figure 14:
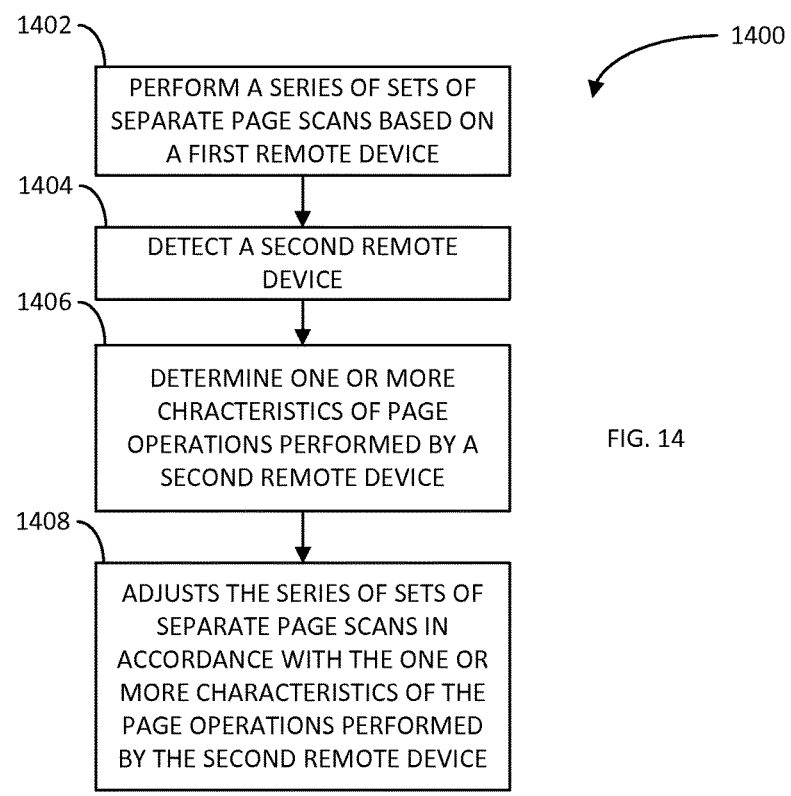
FIG. 14 illustrates a flow diagram of another exemplary method of scanning for a page from a new remote device in accordance with another aspect of the disclosure.

FIG. 14 illustrates a flow diagram of another exemplary method 1400 of scanning for a page transmitted by a remote device in accordance with another aspect of the disclosure. The method 1400 may be implemented by wireless device B 104 in initially attempting to receive a page from wireless device A 102 (e.g., the first remote device), and detecting a second remote device, such as wireless device C (not shown).

According to the method 1400, wireless device B 104 performs a series of sets of separate page scans based on one or more characteristics of page operations performed by wireless device A 102 (block 1402). The one or more characteristics may include one or more of the following: a rate at which the page operations are performed, a duration of the transmission of a page of each page operation, and a duration of the scan for a page response of each page operation. As an example, wireless device B 104 may arrange the time period $t_1$ between separate page scans in a set to be greater than a duration Y1 of the response scan performed by wireless device A 102, and less than the duration X1 of the page transmission performed by wireless device A 102. Alternatively, or in addition to, wireless device B 104 may arrange the period $T_1$ associated with periodic sets of separate page scans based on a rate at which the page operations are performed. Wireless device B 104 may perform the adjustment in order to ensure that one of the page scans in a set occurs during the transmission of a page by wireless device A 102, which allows wireless device B 104 is to receive the page, and send a page response to wireless device A 102 in order to successfully complete the paging procedure.

Then, according to the method 1400, wireless device B 104 detects the presence of wireless device C, or that wireless device C is attempting to page wireless device B 104 (block 1404). In response to detecting the wireless device C, wireless device B 104 determines one or more characteristics of the page operations performed by the wireless device C (block 1406). The one or more characteristics may include one or more of the following: a rate at which page operations are performed, a duration of the transmission of a page of each page operations, and a duration of the scan for a page response of each page operation. Wireless device B 104 may have determined the one or more characteristics of the page operations of the remote device pursuant to a previous communication session between wireless device B 104 and the wireless device C.

Then, according to the method, wireless device B 104 adjusts the sets of separate page scans in accordance with the one or more characteristics of the page operations performed by wireless device C (block 1408). For example, wireless device B 104 may adjust the time period $t_1$ between separate page scans in a set to be greater than a duration of the response scan performed by wireless device C, and less than the duration of the page transmission performed by wireless device C. Alternatively, or in addition to, wireless device B 104 may adjust the period $T_1$ associated with periodic sets of separate page scans based on a rate at which the page operations are performed by wireless device C. Wireless device B 104 may perform the adjustment in order to ensure that one of the page scans in a set occurs during the transmission of a page by wireless device C. Accordingly, wireless device B 104 is able to receive the page, and send a page response to wireless device C in order to successfully complete the paging procedure.

Figure 15:
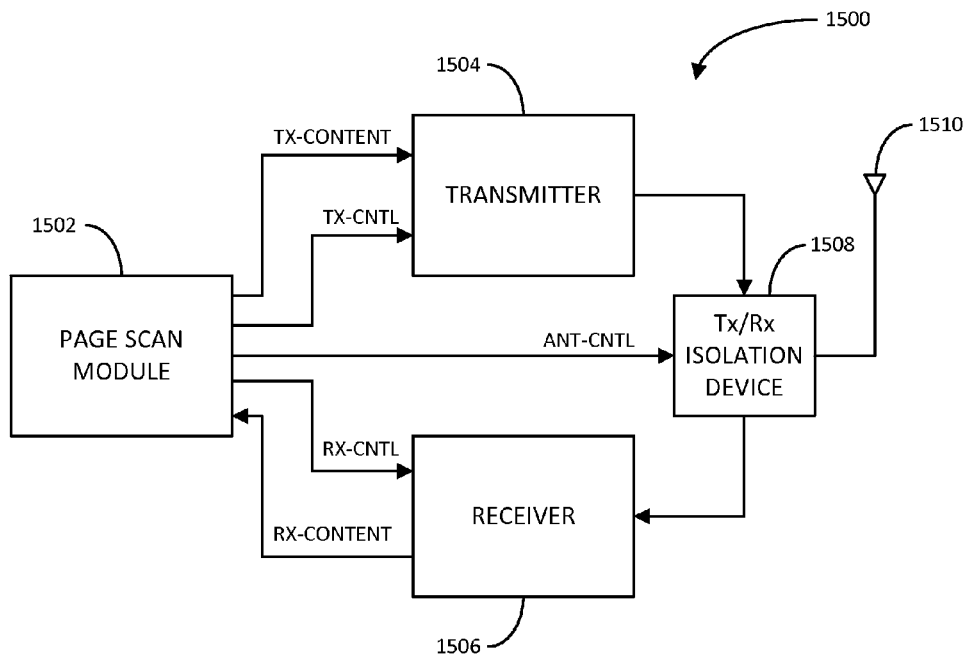
FIG. 15 illustrates a block diagram of an exemplary apparatus in accordance with another aspect of the disclosure.

FIG. 15 illustrates a block diagram of an exemplary apparatus 1500 in accordance with another aspect of the disclosure. The apparatus 1500 may be configured to implement the various page scans, previously discussed with reference to wireless device B 104. The apparatus 1500 comprises a page scan module 1502, a transmitter 1504, a receiver 1506, a Tx/Rx isolation device 1508, and an antenna 1510. Although each of these elements is shown as a single block, it shall be understood that each of them may comprise one or more components. Additionally, as discussed in more detail below, the page scan module 1502 may be implemented as dedicated hardware, software executable by a processor-based system, or a combination of both dedicated hardware and software executable by a processor-based system.

In general, the page scan module 1502 performs any one or more of the various page scan operations described herein. For instance, with regard to the page scan operations previously discussed with reference to FIGS. 3-6, the page scan module 1502 performs a series of page scans for a page from at least one remote device, the at least one remote device configured to periodically perform page operations, wherein each page operation comprises a transmission of the page and a scan for a page response; and arranges the performing of the page scans in time so that if one of two consecutive page scans occurs during one of the page response scans, the other of the two consecutive page scans occurs during the transmission of one of the pages. With regard to the page scan operations discussed with reference to FIGS. 11-14, the page scan module 1502 scans for a page by performing a series of sets of separate scans, wherein a first time interval between two of the separate scans in each set is less than a second time interval between the sets of separate scans.

In more detail, during a page scan interval, the page scan module 1502 configures the transmitter 1504, by way of control signal TX-CNTL, for not transmitting a signal (e.g., disables the transmitter). The page scan module 1502 further configures the Tx/Rx isolation device 1508, by way of control signal ANT-CNTL, to decouple or isolate the transmitter 1504 from the antenna 1510, and couple the antenna 1510 to the receiver 1506. Additionally, the page scan module 1502 configures the receiver 1506 (e.g., enables the receiver), by way of control signal RX-CNTL, for receiving a signal, such as a page from a remote device.

With regard to receiving a page, a modulated carrier signal including the page is received via the antenna 1510 and sent to the receiver 1506 by way of the Tx/Rx isolation device 1508. The receiver 1506 processes the signal to generate the page content (RX-CONTENT). The processing of the page signal may involve any one or more of the following: error correction decoding, channel compensation decoding, de-interleaving, decrypting, constellation de-mapping, and demodulating. The demodulation applied may be of any type, including pulse type demodulation, such as pulse position demodulation. The page scan module 1502 processes the page in order to subsequently transmit a page response to the remote device.

The page scan module 1502 may also be configured to determine one or more characteristics of page operations performed by a remote device. As previously discussed, the one or more characteristics may include a rate at which the page operations are performed by the remote device, the duration of the transmission of a page of each page operation, the duration of the scan for a page response of each page operation, a rate difference between a rate at which page operations are performed by the remote device and a rate at which page scans are performed by page scan module 1502. The page scan module 1502 may arrange or adjust page scans in accordance with any one or more of these characteristics. The page scan module 1502 may determine the one or more characteristics of page operations performed by the remote device by engaging in a discovery or other procedure with the remote device or by accessing information from a standard specifying the characteristic of one or more page scans performed by the remote device.

With regard to the transmission of a page response to the remote device, the page scan module 1502 sends the page response content (TX-CONTENT) to the transmitter 1504 for transmission to a remote device. The transmitter 1504 processes the page response content data to generate a modulated carrier for transmission via a wireless medium. The processing of the page response content data may involve any one or more of the following: error correction coding, channel compensation coding, interleaving, encrypting, constellation mapping, and modulating. The modulation applied may be of any type, including pulse type modulation, such as pulse position modulation. The modulated carrier is sent to the antenna 1510 from the transmitter 1504 by way of the Tx/Rx isolation device 1508 for transmission to the remote device via the wireless medium. The page scan module 1502 may be configured to transmit the page response to the remote device after a predetermined time interval after receiving the page from the remote device. This is done to ensure that the page response is transmitted while the remote device is performing the response scan.

During transmission of the page response, the page scan module 1502 configures the transmitter 1504, by way of control signal TX-CNTL, for transmission of the page (e.g., enables the transmitter). The page scan module 1502 configures the Tx/Rx isolation device 1508, by way of control signal ANT-CNTL, to couple the transmitter 1504 to the antenna 1510, and decouple or isolate the receiver 1506 from the antenna 1510. Additionally, the page scan module 1502 configures to receiver 706, by way of control signal RX-CNTL, for not receiving a signal, such as a page (e.g., disables the receiver).

During intervals where the apparatus 1500 is not scanning for a page and not transmitting a page response, the page scan module 1502 may configure: (1) the transmitter 1504 for not transmitting a signal, such as a page response (e.g., disable the transmitter), by way of control signal TX-CNTL; and (2) the receiver 1506 for not receiving a signal, such as a page (e.g., disable the receiver), by way of control signal RX-CNTL. This may be done to reduce the power consumption of the apparatus 1500 in order to conserve battery power.

Figure 16:
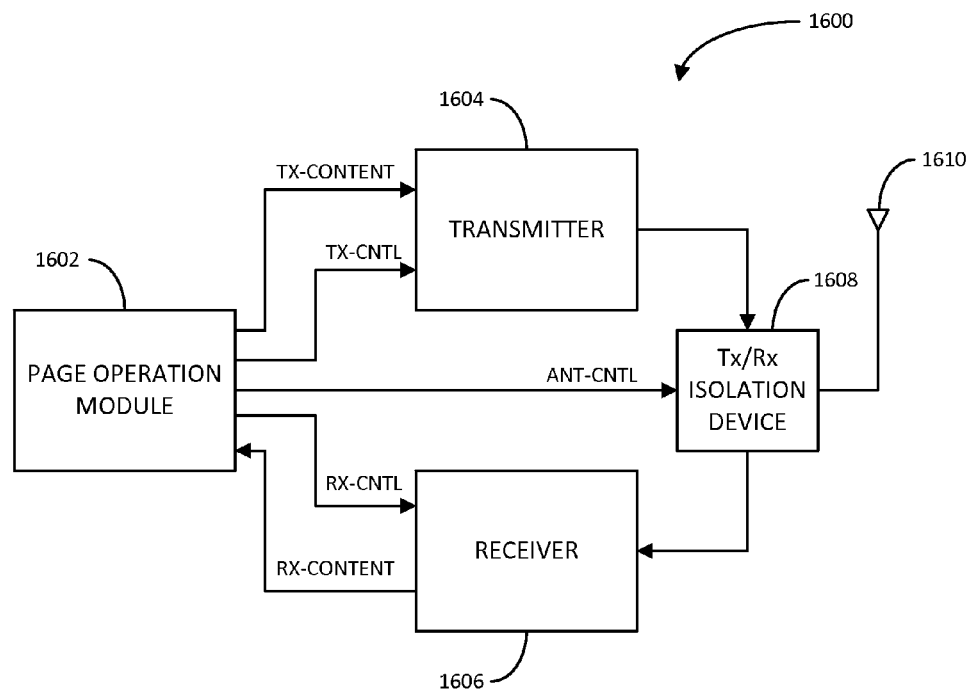
FIG. 16 illustrates a block diagram of another exemplary apparatus in accordance with another aspect of the disclosure.

FIG. 16 illustrates a block diagram of an exemplary apparatus 1600 in accordance with another aspect of the disclosure. The apparatus 1600 may be configured to implement the page operations previously discussed with reference to wireless device A 102. The apparatus 1600 comprises a page operation module 1602, a transmitter 1604, a receiver 1606, a Tx/Rx isolation device 1608, and an antenna 1610. Although each of these elements is shown as a single block, it shall be understood that each of them may comprise one or more components. Additionally, as discussed in more detail below, the page operation module 1602 may be implemented as dedicated hardware, software executable by a processor-based system, or a combination of both dedicated hardware and software executable by a processor-based system.

In general, the page operation module 1602 performs any one or more of the various page operations described herein. For instance, with regard to the page operations previously discussed with reference to FIGS. 7-8, 9A-9D, and 11, the page operation module 1602 performs a series of page operations, wherein each page operation comprises transmitting a page and scanning for a page response, and arranges a timing of the page operations so that if one of two consecutive periodic page scans performed by the at least one remote device occurs during one of the page response scans, the other of the two consecutive periodic page scans occurs during the transmission of one of the pages.

In more detail, with regard to the transmission of a page, the page operation module 1602 sends the page content (TX-CONTENT) to the transmitter 1604 for transmitting the information to a remote device. The transmitter 1604 processes the page content data to generate a modulated carrier for transmission via a wireless medium. The processing of the page content data may involve any one or more of the following: error correction coding, channel compensation coding, interleaving, encrypting, constellation mapping, and modulating. The modulation applied may be of any type, including pulse type modulation, such as pulse position modulation. The modulated carrier is sent to the antenna 1610 from the transmitter 1604 by way of the Tx/Rx isolation device 1608 for transmission to a remote device via the wireless medium.

During transmission of the page, the page operation module 1602 configures the transmitter 1604, by way of control signal TX-CNTL, for transmission of the page (e.g., enables the transmitter). The page operation module 1602 configures the Tx/Rx isolation device 1608, by way of control signal ANT-CNTL, to couple the transmitter 1604 to the antenna 1610, and decouple or isolate the receiver 1606 from the antenna 1610. Additionally, the page operation module 1602 configures the receiver 1606, by way of control signal RX-CNTL, for not receiving a signal, such as a page response (e.g., disables the receiver).

During a scan for a page response, the page operation module 1602 configures the transmitter 1604, by way of control signal TX-CNTL, for not transmitting a signal, such as a page (e.g., disables the transmitter). The page operation module 1602 configures the Tx/Rx isolation device 1608, by way of control signal ANT-CNTL, to decouple or isolate the transmitter 1604 from the antenna 1610, and couple the antenna 1610 to the receiver 1606. Additionally, the page operation module 1602 configures the receiver 1606, by way of control signal RX-CNTL, for receiving a signal, such as a page response (e.g., enables the receiver).

With regard to receiving a page response, a modulated carrier signal including the page response is received via the antenna 1610 and sent to the receiver 1606 by way of the Tx/Rx isolation device 1608. The receiver 1606 processes the signal to generate the page response content (RX-CONTENT). The processing of the page response signal may involve any one or more of the following: error correction decoding, channel compensation decoding, de-interleaving, decrypting, constellation de-mapping, and demodulating. The demodulation applied may be of any type, including pulse type demodulation, such as pulse position demodulation. The page operation module 1602 processes the page response content in order to setup a communication channel with the remote device.

The page operation module 1602 may configure the page operations based on one or more characteristics of page scans performed by a remote device. As previously discussed, the one or more characteristics of the page scans performed by the remote device may include the period T of periodic page scans performed by the remote device, and the rate difference between the rate at which page operations are performed and the rate at which the page scans are performed. The page operation module 1602 may determine the one or more characteristics of the page scans performed by the remote device by engaging in a discovery or other procedure with the remote device or by accessing information from a standard defining the one or more characteristics of the page scans performed by the remote device.

Figure 17:
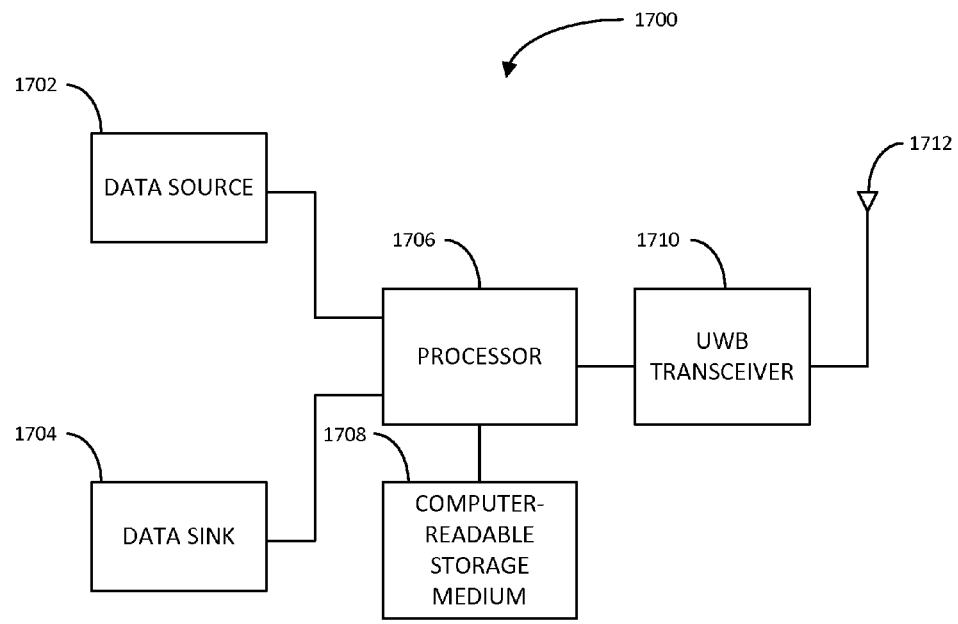
FIG. 17 illustrates a block diagram of another exemplary apparatus in accordance with another aspect of the disclosure.

FIG. 17 illustrates a block diagram of another exemplary apparatus 1700 in accordance with another aspect of the disclosure. As previously discussed with reference to apparatuses 1500 and 1600, an apparatus may implement any of the various page scans and/or page operations described herein. Many distinct apparatuses, configured for distinct applications, may implement any of these various paging operations and/or page scans. The exemplary apparatus 1700 is used herein to exemplify a few applications that the paging operations and/or page scans may be used in conjunction with.

In particular, the apparatus 1700 comprises a data source 1702, a data sink 1704, a processor 1706, a computer-readable storage medium 1708, a transceiver (e.g., an ultra-wideband (UWB) transceiver) 1710, and an antenna 1712. The data source 1702 provides data to the processor 1706 to be processed for transmission to a remote device. The data sink 1704 receives data, which originates from the remote device, from the processor 1706. The processor 1706, under the control of codes or instructions encoded in the computer-readable storage medium 1708, performs the specified processes of the data in accordance with the application being implemented. The processor 1706, also under the control of codes or instructions encoded in the computer-readable storage medium 1708, performs any of the page operations and/or page scans.

For instance, with regard to the page operations previously discussed with reference to FIGS. 7-8, 9A-9D, and 11, the processor 1706 performs a series of page operations, wherein each page operation comprises transmitting a page and scanning for a page response, and arranges a timing of the page operations so that if one of two consecutive periodic page scans performed by the at least one remote device occurs during one of the page response scans, the other of the two consecutive periodic page scans occurs during the transmission of one of the pages.

With regard to the page scan operations previously discussed with reference to FIGS. 3-6, the processor 1706 performs a series of page scans for a page from at least one remote device, the at least one remote device configured to periodically perform page operations, wherein each page operation comprises a transmission of the page and a scan for a page response; and arranges the performing of the page scans in time so that if one of two consecutive page scans occurs during one of the page response scans, the other of the two consecutive page scans occurs during the transmission of one of the pages.

With regard to the page scan operations discussed with reference to FIGS. 11-14, the processor 1706 scans for a page by performing a series of sets of separate scans, wherein a first time interval between two of the separate scans in each set is less than a second time interval between the sets of separate scans.

The UWB transceiver 1710 generates a signal for transmission to a remote device by way of an antenna 1712. The transmitted signal may include data originated from the data source 1702 as well as page content data and/or page response content data. The UWB transceiver 1710 also processes a signal received from the remote device by way of the antenna 1712. The received signal may include data to be sent to the data sink 1704 as well as page response content data and/or page content data. The transmitted signal and the received signal may be modulated for information-transmitting purposes as well as for multiple access purposes (e.g., channel definition) using ultra-wideband (UWB) signals, such as a UWB pulse modulated signal. A UWB signal may be defined as having a fractional bandwidth on the order of 20% or more, a bandwidth on the order of 500 MHz or more, or a fractional bandwidth on the order of 20% or more and a bandwidth on the order of 500 MHz or more.

In terms of some example applications, the apparatus 1700 may be configured as a headset. In such a case, the data source 1702 may be configured as a transducer, such as a microphone, to generate audio data in response to detected sound, such as the voice of a user. The processor 1706, transceiver 1710, and antenna 1712 are used collectively for transmitting the audio data to a remote device. The data sink 1704 may be configured as a transducer, such as one or more speakers, to generate sound based on audio data received from the remote device by way of the antenna 1712, transceiver 1710, and processor 1706.

In another example, the apparatus 1700 may be configured as a watch. In such a case, the data source 1702 may be configured as a user interface, such as a keyboard, to generate data. The processor 1706, transceiver 1710, and antenna 1712 are used collectively for transmitting the data to a remote device. The data sink 1704 may be configured as a user interface, such as a display, to generate a visual indication based on data received from the remote device by way of the antenna 1712, transceiver 1710, and processor 1706.

In yet another example, the apparatus 1700 may be configured as a sensing device. In such a case, the data source 1702 may be configured as a sensor, such as a physiological sensor, to generate sensed data. The processor 1706, transceiver 1710, and antenna 1712 are used collectively for transmitting the sensed data to a remote device. The data sink 1704 may be configured as a controlling device, such as a processor or controller, to control the sensing operation based on data received from the remote device by way of the antenna 1712, transceiver 1710, and processor 1706.

Figure 18:
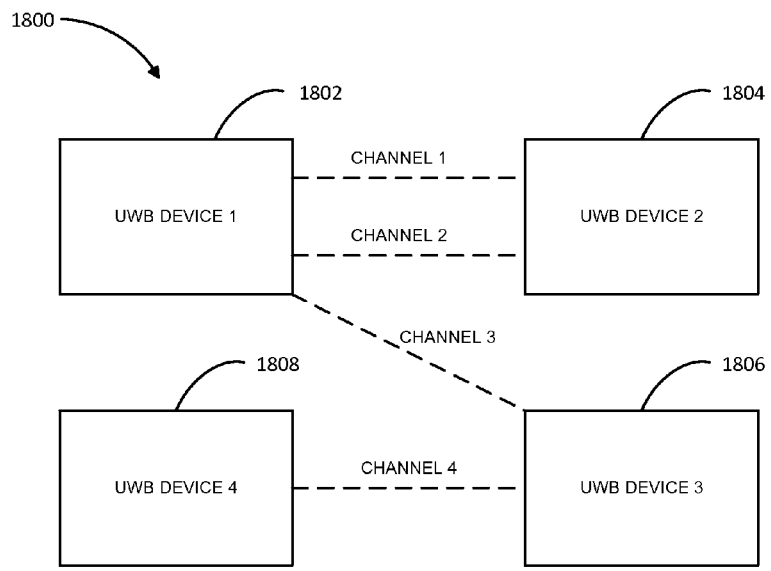
FIG. 18 illustrates a block diagram of an exemplary network in accordance with another aspect of the disclosure.

FIG. 18 illustrates a block diagram of a network 1800 of various ultra-wide band (UWB) communications devices communicating with each other via various channels in accordance with another aspect of the disclosure. The apparatuses described herein may communicate with each other by way of a network. The network 1800 may be setup in distinct manners and used in distinct applications. For example, the network 1800 may be a peer-to-peer type network, an ad hoc type network, a master-slave type network, or other type of network. Additionally, the network 1800 may be configured as a wideband personal area network (WPAN), a wideband body area network (WBAN), or other application type network.

In this example, UWB device 1 1802 is communicating with UWB device 2 1804 via two concurrent UWB channels 1 and 2. UWB device 1802 is communicating with UWB device 3 1806 via a single channel 3. And, UWB device 3 1806 is, in turn, communicating with UWB device 4 1808 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

A processing system may include hardware, software, firmware or any combination thereof. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of scanning for a page, comprising:
performing, by a device, a series of page scans for a transmission of the page including arranging the series of page scans in time so that if one of two consecutive page scans occurs during a scan for a page response from the device, the other of the two consecutive page scans by the device occurs during the transmission of one of the pages, wherein the series of page scans are periodic, and wherein arranging the series of page scans in time comprises setting a period of the periodic page scans, wherein setting the period of the periodic page scans comprises setting the period in accordance with a following relationship:

$$T = \left(n + \frac{1}{2}\right)(X + Y)$$

wherein T is the period of the periodic page scans, X is a duration of the transmission of the page, Y is a duration of the scan for the page response, and n is an integer.

2. The method of claim 1, wherein the device further comprises hardware or software executable by a processor-based system.

3. The method of claim 1, wherein the device includes a headset, a speaker, a watch, a shoe, a remote control, or a tire pressure monitor.

4. The method of claim 1, wherein the device includes a biometric sensor, a heart rate monitor, a pedometer, an EKG device, or a vital sign monitor.

5. An apparatus for scanning for a page from at least one remote device, wherein the at least one remote device is configured to periodically perform page operations, and wherein each page operation comprises a transmission of a page and a scan for a page response, comprising:
a page scan module, the page scan module comprising hardware or software components of the apparatus and configured to perform a series of page scans, wherein the series of page scans are arranged in time so that if one of two consecutive page scans occurs during one of the page response scans, the other of the two consecutive page scans occurs during the transmission of one of the pages, wherein the page scan module is configured to perform the series of page scans in a periodic manner, and wherein the page scan module is configured to arrange the series of page scans in time by at least setting a period of the periodic page scans, wherein the page scan module is configured to set the period of the periodic page scans in accordance with a following relationship:

$$T = \left(n + \frac{1}{2}\right)(X + Y)$$

wherein T is the period of the periodic page scans, X is a duration of the transmission of the page, Y is a duration of the response scan, and n is an integer;
a receiver configured to receive the page from the at least one remote device; and
a transmitter configured to transmit the page response to the at least one remote device.

6. The apparatus of claim 5, wherein the at least one remote device further comprises hardware or software executable by a processor-based system.

7. The apparatus of claim 5, wherein the apparatus includes a headset, a speaker, a watch, a shoe, a remote control, or a tire pressure monitor.

8. The apparatus of claim 5, wherein the apparatus includes a biometric sensor, a heart rate monitor, a pedometer, an EKG device, or a vital sign monitor.

9. The apparatus of claim 5, wherein the at least one remote device includes a headset, a speaker, a watch, a shoe, a remote control, or a tire pressure monitor.

10. The apparatus of claim 5, wherein the at least one remote device includes a biometric sensor, a heart rate monitor, a pedometer, an EKG device, or a vital sign monitor.

11. A method of paging, comprising:
performing, by a device, a series of page operations, the page operations including transmitting a page and scanning for a page response; and
arranging, by the device, a timing of the page operations so that if one of two consecutive periodic page scans performed to receive the transmitted page occurs during one of the page response scans, the other of the two consecutive periodic page scans occurs during the transmission of one of the pages, wherein arranging the timing of the page operations comprises setting a duration of the transmission of the page, wherein setting the duration of the transmission of the page comprises setting the duration in accordance with a following relationship:

$$T = \left(n + \frac{1}{2}\right)(X + Y)$$

wherein T is a period of the periodic page scans performed to receive the transmitted page, X is the duration of the transmission of the page, Y is a duration of the response scan, and n is an integer.

12. The method of claim 11, wherein the device further comprises hardware or software executable by a processor-based system.

13. The method of claim 11, wherein the device includes a headset, a speaker, a watch, a shoe, a remote control, or a tire pressure monitor.

14. The method of claim 11, wherein the device includes a biometric sensor, a heart rate monitor, a pedometer, an EKG device, or a vital sign monitor.

15. A method of paging, comprising:
performing, by a device, a series of page operations, the page operations including transmitting a page and scanning for a page response; and
arranging, by the device, a timing of the page operations so that if one of two consecutive periodic page scans performed to receive the transmitted page occurs during one of the page response scans, the other of the two consecutive periodic page scans occurs during the transmission of one of the pages, wherein arranging the timing of the page operations comprises setting a duration of the response scan, wherein setting the duration of the response scan comprises setting the duration in accordance with a following relationship:

$$T = \left(n + \frac{1}{2}\right)(X + Y)$$

wherein T is a period of the periodic page scans performed to receive the transmitted page, X is a duration of the transmission of the page, Y is the duration of the response scan, and n is an integer.

16. The method of claim 15, wherein the device further comprises hardware or software executable by a processor-based system.

17. The method of claim 15, wherein the device includes a headset, a speaker, a watch, a shoe, a remote control, or a tire pressure monitor.

18. The method of claim 15, wherein the device includes a biometric sensor, a heart rate monitor, a pedometer, an EKG device, or a vital sign monitor.

* * * * *